US008456324B2

(12) United States Patent
Tsuda

(10) Patent No.: US 8,456,324 B2
(45) Date of Patent: Jun. 4, 2013

(54) DRIVING SUPPORT SYSTEM

(75) Inventor: Yoshiaki Tsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 411 days.

(21) Appl. No.: 12/866,637

(22) PCT Filed: Mar. 25, 2009

(86) PCT No.: PCT/JP2009/055900
§ 371 (c)(1),
(2), (4) Date: Aug. 6, 2010

(87) PCT Pub. No.: WO2009/119637
PCT Pub. Date: Oct. 1, 2009

(65) Prior Publication Data
US 2011/0006914 A1    Jan. 13, 2011

(30) Foreign Application Priority Data
Mar. 25, 2008 (JP) ................................ 2008-078255

(51) Int. Cl.
*G08G 1/09* (2006.01)
(52) U.S. Cl.
USPC . 340/905; 340/995.13; 340/917; 340/995.15; 701/117; 701/32.4; 701/437
(58) Field of Classification Search
USPC .............. 340/901–931, 944, 988, 995.1–996; 701/117, 32.4, 408–423, 437; 455/73, 522
See application file for complete search history.

(56) References Cited

U.S. PATENT DOCUMENTS
2008/0207244 A1    8/2008   Roggero

FOREIGN PATENT DOCUMENTS

| JP | 2001 204066 | 7/2001 |
|----|-------------|--------|
| JP | 2001 245332 | 9/2001 |
| JP | 2002 109680 | 4/2002 |
| JP | 2002 135211 | 5/2002 |

(Continued)

OTHER PUBLICATIONS

Tsuda, Y. et al., "Development of Driving Safety Support Systems", p. 319 (Mar. 18-21, 2008) (with English translation).

(Continued)

*Primary Examiner* — George Bugg
*Assistant Examiner* — Sharmin Akhter
(74) *Attorney, Agent, or Firm* — Oblon, Spivak, McClelland, Maier & Neustadt, L.L.P.

(57) ABSTRACT

The invention may allow an in-vehicle unit of a vehicle located in a shadow portion of a large-sized vehicle and an in-vehicle unit of a vehicle at a location separated from an intersection 193 to receive traffic information. A UHF beacon unit 112 is disposed at the intersection 193, thereby distributing the traffic information using a UHF beacon signal having a diffraction characteristic. This arrangement can allow the in-vehicle unit of the vehicle located in the shadow portion of the large-sized vehicle as well to receive the traffic information. Further, since the UHF signal propagates far, this arrangement can allow the in-vehicle unit of the vehicle at the location separated from the intersection 193 as well to receive the traffic information. The UHF beacon unit 112 transmits the UHF beacon signals with the different traffic information set therein by time division and frequency division. In this case, the UHF beacon unit 112 transmits the UHF beacon signals with the different traffic information set therein with different transmission output powers. With this arrangement, the different traffic information can be respectively distributed to a near-distance zone 291, an intermediate-distance zone 292, and a far-distance zone 293.

17 Claims, 16 Drawing Sheets

FOREIGN PATENT DOCUMENTS

| | | |
|---|---|---|
| JP | 2002 315048 | 10/2002 |
| JP | 2003 23388 | 1/2003 |
| JP | 2003 224505 | 8/2003 |
| JP | 2003 298507 | 10/2003 |
| JP | 2004 5035 | 1/2004 |
| JP | 2007 193624 | 8/2007 |
| JP | 2007 219588 | 8/2007 |
| JP | 2008 15801 | 1/2008 |
| WO | 2006 106455 | 10/2006 |

OTHER PUBLICATIONS

U.S. Appl. No. 13/395,580, filed Mar. 12, 2012, Tsuda.

DRIVING SUPPORT SYSTEM

TECHNICAL FIELD

The present invention relates to a driving support system that supports safety driving by providing traffic information, using a UHF (Ultra-High Frequency) wave, for example.

BACKGROUND ART

At present, verification experiments of driving safety support systems (hereinafter referred to DSSS [Driving Safety Support Systems]) have been carried out so as to prevent traffic accidents caused by carelessness of drivers, which occur at intersections and on approach roads to the intersections.

The DSSS, for example, are systems which provide to a driver a traffic condition around the driver in the form of information that may be visually and acoustically recognized (such as a display of an alerting image or an output of an alerting voice message) and calls attention to a dangerous factor. Relaxed driving is thereby supported.

The DSSS include a transmitter (hereinafter referred to as an optical beacon unit) that transmits an optical signal, a transmitter (hereinafter referred to as a DSRC beacon unit) that transmits an electric wave of a 5.8 GHz band, an apparatus on a road side (hereinafter referred to as an information relay and determination apparatus) including a roadside control unit (information relay and determination device), an in-vehicle unit that exchanges data with the optical beacon unit and the DSRC beacon unit.

The DSSS further include a sensor (hereinafter referred to as a detection sensor) including a vehicle detection sensor and a pedestrian detection sensor, and a signal controller (hereinafter referred to as the signal controller), as apparatuses on the road side. The DSSS include a function of detecting position information, speed information, the number of vehicles, and the number of people detected by the vehicle detection sensor and the pedestrian detection sensor. The vehicle detection sensor detects distances of a four-wheeled vehicle and an automatic two-wheeled vehicle from an intersection and running speeds of the four-wheeled and automatic two-wheeled vehicles as they enter into the intersection. The pedestrian detection sensor detects a pedestrian walking on a crosswalk within the intersection and a bicycle on the crosswalk. The signal controller controls a traffic flow at the intersection. The roadside control unit collects intersection signal information from the signal controller and the information detected by the detection sensor, and transmits those information to the optical beacon unit and the DSRC beacon unit.

The optical beacon unit is installed before the intersection. The optical beacon unit transmits the position of a lane on which the vehicle is running and provision of a DSSS service. The optical beacon unit provides to the vehicle static information (hereinafter referred to as fixed information) such as geographical information on the size of the intersection, presence or absence of a side road, through the in-vehicle unit that has received an optical beacon.

The roadside control unit (information relay and determination device) collects information on the position of an oncoming vehicle entering into the intersection and the speed of the oncoming vehicle and information on the presence of the pedestrian or the bicycle on the crosswalk within the intersection, detected by the detection sensors. The roadside control unit further collects information on the color of a traffic light output from the signal controller. The roadside control unit thereby prepares traffic (intersection) information that changes real time and transmits the traffic (intersection) information to the DSRC beacon unit.

The DSRC beacon unit is installed in the vicinity of the intersection, and provides to the vehicle the traffic information that has been prepared by the roadside control unit and changes real time.

Using the above-mentioned DSSS, a right-turn accident prevention service and a left-turn hit accident prevention system at an intersection, for example, have been evaluated and verified.

Patent Document 1: JP2007-219588A

DISCLOSURE OF THE INVENTION

Problems to be Solved by the Invention

The above-mentioned DSSS have a problem that the in-vehicle unit located in a shadow portion of a large-size vehicle such as a truck or a bus cannot receive the information from the DSRC beacon unit (hereinafter referred to as shadowing) at the intersection.

A driving safety support service (such as a rear-end collision prevention service) using the DSSS can be provided just in the vicinity of the intersection. It is desired, however, that the driving safety support service be provided to a vehicle having an in-vehicle unit at a position separated from the intersection (by 100 m or more) as well.

An object of the present invention is to allow an in-vehicle unit of a vehicle located in a shadow portion of a large-sized vehicle as well to receive traffic information.

A further object of the present invention is to allow an in-vehicle unit of a vehicle running at a location separated from an intersection as well to receive traffic information.

Means for Solution to the Problems

A driving support system of the present invention is a driving support system including a UHF roadside unit that provides traffic information to an in-vehicle unit mounted on a vehicle using a UHF (Ultra-High Frequency) wave. The UHF roadside unit respectively sets a plurality of traffic information having different contents on UHF waves of different frequencies and transmits each of the UHF waves using a different transmission output power.

The UHF roadside unit transmits each of the UHF waves by time division.

The UHF roadside unit transmits three UHF waves of different frequencies as the respective UHF waves in ascending order of magnitude of transmission output powers at a time ratio of 6:3:1.

The driving support system includes a plurality of the UHF roadside units; and

The plurality of the UHF roadside units are disposed at intervals so that zones reached by the UHF waves transmitted with smallest ones of the transmission output powers do not overlap with one another and zones reached by the UHF waves transmitted with largest ones of the transmission output powers overlap with one another.

The frequencies of the UHF waves transmitted with the largest ones of the transmission output powers are different to each other between the UHF roadside units disposed adjacent to each other.

The driving support system includes first to fourth UHF roadside units;

each of the first to fourth UHF roadside units uses a first frequency for the UHF wave transmitted with a smallest one of the transmission output powers and a second frequency for the UHF wave transmitted with a second smallest one of the transmission output powers;

the first UHF roadside unit uses a third frequency for the frequency of the UHF wave transmitted with the largest one of the transmission output powers;

the second UHF roadside unit uses a fourth frequency for the frequency of the UHF wave transmitted with the largest one of the transmission output powers;

the third UHF roadside unit uses a fifth frequency for the frequency of the UHF wave transmitted with the largest one of the transmission output powers; and the fourth UHF roadside unit uses a sixth frequency for the frequency of the UHF wave transmitted with the largest one of the transmission output powers.

The UHF roadside unit uses six frequency bands that do not overlap with one another within a specific bandwidth of approximately 10.0 MHz included in a UHF frequency band, and transmits the UHF waves using the frequency bands that are mutually different.

The six frequency bands respectively have a bandwidth of approximately 1.5 MHz and an interval between the mutual bands has a bandwidth of approximately 0.2 MHz.

Respective center frequencies of the six frequency bands are approximately 715.75 MHz, 717.45 MHz, 719.15 MHz, 720.85 MHz, 722.55 MHz, and 724.25 MHz.

The UHF roadside unit transmits the UHF wave including information indicating the frequency of the UHF wave, the frequency of the UHF wave being set in advance corresponding to each of a plurality of the zones having different distances from the UHF roadside unit; and the in-vehicle unit mounted on the vehicle switches a reception frequency to the frequency of the UHF wave corresponding to the zone in which the vehicle is positioned, based on the UHF wave transmitted from the UHF roadside unit and a result of position measurement of the vehicle by a GPS mounted on the vehicle, and receives the UHF wave corresponding to the zone in which the vehicle is positioned among the UHF waves transmitted from the UHF roadside unit.

The UHF roadside unit transmits the UHF wave including road information indicating information on an object located on a road; and the in-vehicle unit mounted on the vehicle identifies a running position of the vehicle based on the road information included in the UHF wave transmitted from the UHF roadside unit.

The in-vehicle unit mounted on the vehicle inputs warning information from an input device and transmits the warning information using a frequency that is the same as the frequency of the UHF wave received from the UHF roadside unit; and the UHF roadside unit receives the warning information transmitted from the in-vehicle unit, includes the received warning information on each of the UHF waves, and transmits the received warning information.

The in-vehicle unit mounted on the vehicle inputs warning information from an input device and transmits the warning information using the frequency of the UHF wave that is not used for the UHF roadside unit; and the UHF roadside unit receives the warning information transmitted from the in-vehicle unit, includes the received warning information in each of the UHF waves, and transmits the received warning information.

In the driving support system, two DSRC (Dedicated Short Range Communication) roadside units each of which provides traffic information to the in-vehicle unit mounted on the vehicle using an SHF (Super High Frequency) wave are further disposed at an intersection of right-angle crossroads; and the two DSRC roadside units disposed at the intersection of the right-angle crossroads transmit SHF waves to the intersection in diagonal directions that cross each other.

One of the two DSRC roadside units transmits the SHF wave from a direction facing the vehicle when the vehicle that turned left from a main road toward a sub-road has entered into the intersection.

In the driving support system, two DSRC (Dedicated Short Range Communication) roadside units each of which provides traffic information to the in-vehicle unit mounted on the vehicle using an SHF (Super High Frequency) wave are further disposed at an intersection of right-angle crossroads; and the two DSRC roadside units disposed at the intersection of the right-angle crossroads transmit SHF waves to a traffic path through which the vehicle enters into the intersection.

Each of the two DSRC roadside units transmits the SHF wave from a direction facing the vehicle when the vehicle that turned left from a main road toward a sub-road has entered into the intersection.

Effects of the Invention

According to the present invention, traffic information may be provided to the in-vehicle unit of a vehicle located in the shadow portion of a large-sized vehicle due to a diffraction wave property of an electric wave propagation characteristic of the UHF wave, for example.

Further, according to the present invention, traffic information may be received by the in-vehicle unit of a vehicle running at a location separated from an intersection, due to a propagation loss characteristic of the UHF wave, for example.

BEST MODE FOR CARRYING OUT THE INVENTION

Embodiment 1

Driving safety support systems 100 that use three communication media of an optical beacon, a DSRC beacon, and a UHF beacon will be described in Embodiment 1.

FIG. 1 is a diagram showing a configuration of the driving safety support systems 100 in Embodiment 1.

The configuration of the driving safety support systems 100 in Embodiment 1 will be described below, based on FIG. 1.

The driving safety support systems 100 are also referred to as DSSS or ITS (Intelligent Transport Systems).

The driving safety support systems 100 include a roadside apparatus 110, an optical roadside apparatus 120, a roadside control units 130, and a signal controller 195, and provide traffic information to an in-vehicle unit of a vehicle 199 running at an intersection 193 and at a location separated from the intersection 193.

Each of the roadside apparatus 110, the optical roadside apparatus 120, the roadside control unit 130, the signal controller 195, and an in-vehicle unit comprises a CPU (Central Processing Unit) (referred to as the central processing unit, an arithmetic unit, a microprocessor, or a microcomputer), and executes each processing using the CPU. Each of the roadside apparatus 110, the optical roadside apparatus 120, the roadside control unit 130, and the signal controller 195, and the in-vehicle unit includes a storage device (also referred to as a memory), and stores each information using the storage device. A RAM (Random Access Memory) or a magnetic disk device is an example of the storage device.

The roadside apparatus 110, the optical roadside apparatus 120, the roadside control unit 130, and the signal controller 195 are connected by a communication cable and communicate one another through the communication cable.

The signal controller 195 is connected to each traffic light 194 at the intersection 193 through the communication cable, and controls a color and a turned-on time of each traffic light 194 through the communication cable, based on predetermined control information. The signal controller 195 transmits the control information on each traffic light 194 to the roadside control unit 130. The control information on the traffic light 194 is stored in the storage device in advance, or is transmitted from a traffic control center that is an upper-level equipment of the traffic light controller 195.

The optical roadside apparatus 120 is installed before the intersection 193, includes an optical beacon unit 121 for each traffic lane (lane), and transmits an optical beacon (optical wave) signal to the in-vehicle unit of a vehicle 199 that runs below each optical beacon unit 121. The optical roadside apparatus 120 sets static traffic information in the optical beacon signal transmitted from each optical beacon unit 121. The static traffic information includes coordinate values of the optical beacon unit 121, information on lanes (such as a straight lane, a left-turn lane, and a right-turn lane), information indicating provision of a DSSS service at the intersection of an entry destination, a distance to the intersection, the size of the intersection, and presence or absence of a side road. The static traffic information is stored in the storage device in advance.

The in-vehicle unit of each vehicle 199 receives the optical beacon signal in which the traffic information has been set, from the optical beacon unit 121 installed above the lane on which the vehicle is running. The in-vehicle unit obtains the traffic information from the received optical beacon signal. The in-vehicle unit of each vehicle 199 transmits driving information on the speed, whether a blinker is on or not, the type of the vehicle, an in-vehicle unit ID (IDenfier), and the like to the optical beacon unit 121 by an optical wave.

The optical beacon unit 121 receives the driving information from the in-vehicle unit of the vehicle 199. The optical roadside apparatus 120 transmits the driving information received through the optical beacon unit 121 to the roadside control unit 130.

The optical beacon unit 121 may also be referred to as the optical roadside apparatus 120.

The roadside control unit 130 generates the traffic information, based on the control information on the traffic light 194 received from the signal controller 195, the driving information on a running vehicle received from the optical roadside apparatus 120, identification information on the running vehicle and identification information on a pedestrian or a bicycle on a crosswalk within the intersection that have been received from an image sensor 113 which will be described later. The roadside control unit 130 transmits the generated traffic information to each roadside apparatus 110.

Based on the control information on the traffic light 194, the roadside control unit 130 sets in the traffic information a period of time in which the color of the traffic light 194 changes from blue to red, for example, as dynamic information.

Based on the driving information on the running vehicle and the identification information on the running vehicle, the roadside control unit 130 sets presence or absence of a running vehicle on each lane in the traffic information, for example, as the dynamic information.

The roadside control unit 130 sets the information on the lanes at the intersection and information on the side road in the traffic information, for example, as static information. The static traffic information is stored in the storage device in advance.

The roadside control unit 130 sets a transmission frequency of a UHF beacon unit 112 that will be described later, for example, in the traffic information. The transmission frequency of the UHF beacon unit 112 is stored in the storage device in advance. The transmission frequency of the UHF beacon unit 112 may be set in each UHF beacon unit 112 in advance.

The roadside apparatus 110 (DSRC roadside apparatus, a UHF roadside apparatus) comprises a DSRC beacon unit 111, the UHF beacon unit 112, and the image sensor 113, and is installed at an entrance of an intersection.

The roadside apparatus 110 transmits to the roadside control unit 130 the identification information of the running vehicle and the identification information of the pedestrian or the bicycle on the crosswalk within the intersection, detected by the image sensor 113. The roadside apparatus 110 transmits the traffic information transmitted from the roadside control unit 130 to the in-vehicle unit of each vehicle 199 using the DSRC beacon unit 111 and the UHF beacon unit 112.

The DSRC beacon unit 111 and the UHF beacon unit 112 may be respectively referred to as a DSRC roadside apparatus and a UHF roadside apparatus.

The DSRC beacon unit 111 sets the traffic information generated by the roadside control unit 130 on an electric wave of a 5.8 GHz band, and transmits the electric wave with the traffic information set thereon to the in-vehicle unit of each vehicle 199, as a DSRC beacon signal.

The DSRC beacon is an example of a microwave, and is also referred to as an SHF (Super High Frequency) wave.

The UHF beacon unit 112 sets the traffic information generated by the roadside control unit 130 on a UHF wave (of a 700 MHz band, for example), and transmits the UHF wave with the traffic information set thereon to the in-vehicle unit of each vehicle 199 as a UHF beacon signal.

The UHF beacon is an example of an electric wave or the microwave.

The image sensor 113 captures an image of a running lane (left lane), performs image processing of the captured image, and detects presence or absence of a running vehicle and the type of the running vehicle (such as a large-sized vehicle, a standard-sized vehicle, or a two-wheeled vehicle). When collecting information on the crosswalk at the intersection, the image sensor 113 is installed at a location where an image of the crosswalk may be captured. With this arrangement, an image of a pedestrian walking on the crosswalk or a bicycle is captured, and image processing of the captured image is performed to detect presence or absence of the pedestrian or bicycle. In the image processing, presence or absence of a running vehicle and the type of the running vehicle are detected by pattern matching or comparison with an image when no vehicle is running. In the pattern matching, a pattern indicating a vehicle is detected from the image. Similarly, presence or absence of a pedestrian or a bicycle is also detected.

The in-vehicle unit of each vehicle 199 receives the optical beacon signal transmitted from the optical beacon unit 121, the DSRC beacon signal transmitted from the DSRC beacon unit 111, and the UHF beacon signal transmitted from the UHF beacon unit 112. The in-vehicle unit obtains the traffic information from each beacon signal that has been received. Then, the in-vehicle unit executes various safe driving support processes, based on the obtained traffic information.

The in-vehicle unit updates coordinates of a current location used by a car navigation system (hereinafter referred to as a car-navi) by coordinate values set in the traffic information in the optical beacon signal, for example.

The in-vehicle unit displays the lane information on the running vehicle or the distance to the intersection, set in the traffic information in the optical beacon signal on a display device (hereinafter referred to as a screen) of the car-navi or outputs the lane information or the distance as a voice message, for example.

The in-vehicle unit calculates the time taken for entering into the intersection 193, based on the distance to the intersection 193 set in the traffic information in the optical beacon signal and a running speed measured within the vehicle 199. The in-vehicle unit outputs a voice message prompting deceleration or performs deceleration control of the vehicle 199, based on the time taken for entering into the intersection and the time taken for a change of the color of the traffic light into red, set in the traffic information in a DSRC beacon signal and a UHF beacon signal.

When the vehicle 199 turns right, the in-vehicle unit alerts a driver to the presence of a straight-running vehicle (such as a two-wheeled vehicle) on an opposite lane that is hidden behind a large-sized vehicle and is difficult to be seen from the driver, for example. This alert is given by output of a voice message or screen display of the car-navi, based on the information on running vehicles set in the traffic information in a DSRC beacon signal and a UHF beacon signal. With this arrangement, the number of collisions between a right-turning vehicle and a straight-running vehicle (hereinafter referred to as right-turn accidents) may be reduced.

When the vehicle 199 turns left, the in-vehicle unit alerts the driver to the presence of a two-wheeled vehicle running straight from behind by output of a voice message or screen display of the car-navi, for example. This alert is given, based on the information on running vehicles set in the traffic information in a DSRC beacon signal and a UHF beacon signal. This may reduce the number of left-turn hit accidents.

FIG. 2 is a diagram showing distribution of the traffic information by the driving safety support systems 100 in Embodiment 1 at a time of shadowing.

As shown in FIG. 2, when a large-sized vehicle 199a is present before the roadside apparatus 110 and a standard-sized vehicle 199b is present just behind the large-sized vehicle 199a, a DSRC beacon signal transmitted from the DSRC beacon unit 111 has a comparatively strong rectilinearity. Thus, the DSRC beacon signal is blocked by the large-sized vehicle 199a, and does not reach the standard-sized vehicle 199b.

On the other hand, since the UHF beacon signal transmitted from the UHF beacon unit 112 has a diffraction wave property, the UHF beacon signal reaches the standard-sized vehicle 199b.

In other words, in the driving safety support systems 100 in Embodiment 1, the traffic information is distributed using the UHF beacon. The traffic information may be thereby distributed to a blocked region (shadowing region) to which a conventional DSRC beacon cannot distribute the traffic information.

FIG. 3 is a graph showing a DSRC beacon electric field strength characteristic at a time of non-shadowing (non-shadowing 201), an electric field strength characteristic of a DSRC beacon at a time of shadowing (DSRC beacon 202), and an electric field strength characteristic of a UHF beacon at the time of shadowing (UHF beacon 203).

Electric field strengths of the DSRC beacon 202 and the UHF beacon 203 measured at various locations when the large-sized vehicle 199a is present at a location separated from an intersection by approximately 10 meters will be described below, based on FIG. 3.

The non-shadowing 201 indicates the electric field strength of the DSRC beacon measured when the large-sized vehicle 199a is not present.

As shown in FIG. 3, the electric field strength of the DSRC beacon 202 behind the large-sized vehicle 199a (at a location that is distant by 10 or more meters from the intersection) is very small. The DSRC beacon 202 is not therefore received by the in-vehicle unit of the standard-sized vehicle 199b positioned behind the large-sized vehicle 199a. This is because the DSRC beacon 202 has a stronger rectilinearity than the UHF beacon 203, and is blocked by the large-sized vehicle 199a.

On the other hand, though the electric field strength of the UHF beacon 203 behind the large-sized vehicle 199a is more or less weakened, the electric field strength of the UHF beacon 203 is sufficiently maintained so that reception of the UHF beacon 203 by the in-vehicle unit is possible. Then, the UHF beacon 203 is received by the in-vehicle unit of the standard-sized vehicle 199b located behind the large-sized vehicle 199a. This is because the UHF beacon 203 has a stronger diffraction wave property than the DSRC beacon 202.

The transmission rate of the DSRC beacon (which is approximately 4 Mbps) is faster than the transmission rate of the UHF beacon (which is approximately 1.5 Mbps in Embodiment 3). Thus, the DSRC beacon has a large data size, and may distribute an image or a sound that would be difficult to distribute by the UHF beacon.

Then, in the driving safety support systems 100 in Embodiment 1, the necessary but minimum amount of the traffic information that is highly important is distributed in the form of text data, using the UHF beacon. Then, all of the traffic information is distributed in the form of text data, image data, and sound data, using the DSRC beacon. An image captured by the image sensor 113, an animation that will be displayed on a car-navi screen for alerting, or a warning voice message that will be output within the vehicle 199 may be distributed, using the DSRC beacon.

In other words, in Embodiment 1, by using the UHF beacon, the traffic information that indicates a high danger level or a high importance level for the driver may be distributed to the vehicle 199 located in the shadowing region. Together with this distribution, by using the DSRC beacon, more traffic information may be distributed to the vehicle 199 located in a non-shadowing region.

In Embodiment 1, the driving safety support systems 100 as follows were described.

The UHF beacon unit 112 is disposed in the vicinity of the DSRC beacon unit 111, and the traffic information (such as intersection information) is provided using the UHF beacon as well as the DSRC beacon.

With this arrangement, even if communication between the DSRC beacon and the in-vehicle unit cannot be performed due to shadowing, communication with the in-vehicle unit can be performed by using the diffraction wave property of the UHF wave. The traffic information may be thereby provided to the in-vehicle unit.

Embodiment 2

In Embodiment 2, the following feature will be described. That is, a long-distance communication characteristic (propagation loss characteristic) of the UHF beacon that can be communicated farther than the DSRC beacon is utilized in the driving safety support systems 100 described in Embodiment 1. Then, a communicable range (electric wave reach range) of the UHF beacon is divided into a plurality of UHF communication zones according to the distance from the UHF beacon unit 112. Different traffic information is distributed to each zone from the UHF beacon unit 112.

FIG. 4 is a diagram showing a distribution zone of a traffic information by a UHF beacon in Embodiment 2.

In Embodiment 2, the electric wave reach range of the UHF beacon is divided into three zones of a near-distance zone 291, an intermediate-distance zone 292, and a far-distance zone 293, as shown in FIG. 4. The near-distance zone 291 is close to the UHF beacon unit 112. In the intermediate-distance zone 292, a distance from the UHF beacon unit 112 is farther than in the near-distance zone 291. In the far-distance zone 293, a distance from the UHF beacon unit 112 is farther than in the intermediate-distance zone 292.

Assume that a ratio among farthest distances of the respective zones from the UHF beacon unit 112 is set to 1:2:4, for example. Then, a range of a radius of approximately 100 meters from the UHF beacon unit 112 is set to the near-distance zone 291. A range of a radius of approximately 200 meters from the UHF beacon unit 112 (excluding the near-distance zone 291) is set to the intermediate-distance zone 292. A range of a radius of approximately 400 meters from the UHF beacon unit 112 (excluding the near-distance zone 291 and the intermediate-distance zone 292) is set to the far-distance zone 293.

The near-distance zone 291, the intermediate-distance zone 292, and the far-distance zone 293 are concentric ranges centering on the UHF beacon unit 112.

Then, the different traffic information is distributed to each zone at a different frequency in a different time zone. In other words, the different traffic information is distributed to the different zones by time-division and frequency division, in Embodiment 2.

For example, near-distance traffic information for a near distance is distributed to the near-distance zone 291 at a frequency f1 in a first time zone. Intermediate-distance traffic information for an intermediate distance is distributed to the intermediate-distance zone 292 at a frequency f2 in a second time zone. Far-distance traffic information for a far distance is distributed to the far-distance zone 293 at a frequency f3 in a third time zone.

The far-distance traffic information that is distributed to the far-distance zone 293 indicates DSSS system information (or service information) and road information on the far-distance zone 293, for example. The DSSS system information indicates presence or absence of provision of the traffic information (presence or absence of provision of service), an operating frequency for each zone, and the range of each zone. The range of each zone is represented by a distance from the intersection 193 or the UHF beacon unit 112, the radius of each zone, or absolute coordinates. The DSSS system information and the road information on the far-distance zone 293 are static information set in advance.

The intermediate traffic information that is distributed to the intermediate-distance zone 292 indicates road information on the intermediate-distance zone 292 and traffic restriction information on the near-distance zone 291, for example. The traffic restriction information on the near-distance zone 291 is information indicating a caution against a congestion, an accident, or a road construction work that may have occurred in the near-distance zone 291 at a time of entering into the near-distance zone 291. The road information on the intermediate-distance zone 292 is static information set in advance. The traffic restriction information on the near-distance zone 291 is dynamic information generated by the roadside control unit 130.

The near-distance traffic information that is distributed to the near-distance zone 291 indicates information on the intersection 193 that changes real time, for example. The information on the intersection 193 that changes real time is information indicating a caution when entering into the intersection 193, and includes information on an oncoming vehicle, information on a two-wheeled vehicle running along a roadside, information on the number of pedestrians on a crosswalk and presence or absence of a bicycle, control information on a traffic light, and the like. The real time information on the intersection 193 is dynamic information generated by the roadside control unit 130.

FIG. 5 is a graph showing propagation loss characteristics of the DSRC beacon 202 and the UHF beacon 203.

As shown in FIG. 5, the UHF beacon 203 has a smaller electric field strength loss (propagation loss) with respect to a propagation distance than the DSRC beacon 202.

To take an example, the transmission loss of the UHF beacon 203 is on the order of "−80 dBm" even at a location where the propagation distance is 400 meters. Thus, the in-vehicle unit can receive UHF beacon information in a UHF beacon 203 even at a location separated from the UHF beacon unit 112 by 400 meters.

FIG. 6 is a flowchart indicating a method of transmitting the UHF beacon signal by the UHF beacon unit 112 in Embodiment 2.

FIG. 7 is a graph showing time division, frequency division, and transmission output powers of the UHF beacon signals in Embodiment 2.

A method of distributing different traffic information to each zone by one UHF beacon unit 112 will be described below based on FIGS. 6 and 7.

<S110: Transmission Process to Near-Distance Zone>

The UHF beacon unit 112 transmits the UHF beacon signal of the frequency f1 with the near-distance traffic information set therein, with predetermined low power (10 mW in FIG. 7).

The UHF beacon signal with the near-distance traffic information set therein will be hereinafter referred to as a near-distance UHF beacon signal.

Since the near-distance UHF beacon signal is transmitted with the low power, the near-distance UHF beacon signal reaches only the near-distance zone 291, and does not reach the intermediate-distance zone 292 and the far-distance zone 293.

The in-vehicle unit of a vehicle running in the near-distance zone 291 can receive the near-distance UHF beacon signal by switching a reception frequency to f1. The in-vehicle unit can thereby obtain the near-distance traffic information.

<S111: Time Waiting Process for Near Distance>

The UHF beacon unit 112 waits for an elapse of time for the near distance (6 msec [=0.6 cycle] in FIG. 7) set in advance as a transmission period of the near-distance traffic information. The UHF beacon unit 112 continues the transmission process to the near-distance zone (in step S110) until the time set for the near distance has elapsed. The time for the near distance is also referred to as a time slot for the near distance.

<S120: Transmission Process to Intermediate-Distance Zone>

The UHF beacon unit 112 transmits a UHF beacon signal of the frequency f2 with the intermediate-distance traffic information set therein, with power of a predetermined intermediate level (40 mW in FIG. 7).

The UHF beacon signal with the intermediate-distance traffic information set therein will be hereinafter referred to as an intermediate-distance UHF beacon signal.

Since the intermediate-distance UHF beacon signal is transmitted with the power of the intermediate level, the intermediate-distance UHF beacon signal reaches the intermediate-distance zone 292, and does not reach the far-distance zone 293.

The in-vehicle unit of a vehicle running in the intermediate-distance zone 291 can receive the intermediate-distance UHF beacon signal by switching a reception frequency to f2. The in-vehicle unit can thereby obtain the intermediate-distance traffic information.

<S121: Time Waiting Process for Intermediate Distance>

The UHF beacon unit 112 waits for an elapse of time for the intermediate distance (3 msec [=0.3 cycle]) set in advance as a transmission period of the intermediate-distance traffic information. The UHF beacon unit 112 continues the transmission process for the intermediate-distance zone (in step S120) until the time set for the intermediate distance has elapsed. The time for the intermediate distance is also referred to as a time slot for the intermediate distance.

<S130: Transmission Process to Far-Distance Zone>

The UHF beacon unit 112 transmits a UHF beacon signal of the frequency f3 with the far-distance traffic information set therein, with predetermined high power (100 mW in FIG. 7).

The UHF beacon signal with the far-distance traffic information set therein will be hereinafter referred to as a far-distance UHF beacon signal.

The in-vehicle unit of a vehicle running in the far-distance zone 293 can receive the far-distance UHF beacon signal by switching a reception frequency to f3. The in-vehicle unit can thereby obtain the far-distance traffic information.

<S131: Time Waiting Process for Far Distance>

The UHF beacon unit 112 waits for an elapse of time for the far distance (1 msec [=0.1 cycle]) set in advance as a transmission period of the far-distance traffic information. The UHF beacon unit 112 continues the transmission process for the far-distance zone (in step S130) until the time set for the far distance has elapsed. The time for the far distance is also referred to as a time slot for the far distance.

The UHF beacon unit 112 sets the processes in steps S110 to S131 to one cycle (of e.g. 10 msec) and repeatedly executes the processes.

By distributing the traffic information for each zone by time division as described above, the different traffic information can be distributed to each zone by one UHF beacon unit 112. The number of the UHF beacon units 112 can be thereby reduced, and the cost of the system can be reduced.

Note, however, that only the number of the UHF beacon units 112 equal to the number of the zones may be provided, and that the UHF beacon signal for the different zone may be distributed from each of the UHF beacon units 112 at a different frequency in a same time zone.

Further, by setting power of the transmission output of the UHF beacon for the near distance and power of the transmission output of the UHF beacon for the intermediate distance not to be high, power consumption can be reduced.

As shown in FIG. 7, the one cycle is formed of the time for the near distance of six msec, the time for the intermediate distance of three msec, and the time for the far distance of one msec. The ratio of the number of seconds among the time for the near distance, the time for the intermediate distance, and the time for the far distance may be changed according to the amounts of information that is output to the near-distance zone 291, intermediate-distance zone 292, and far-distance zone 293. Further, the number of seconds other than 10 msec may be used for the one cycle.

FIG. 8 is a flowchart showing an operation method of the in-vehicle unit in Embodiment 2.

An operation of the in-vehicle unit of a vehicle running from a distant location toward the intersection 193 will be described below, based on FIG. 8.

<S210: Far-Distance Traffic Information Reception Process>

When the vehicle running toward the intersection 193 approaches the far-distance zone 293, the in-vehicle unit switches its reception frequency to the frequency f3 for the far-distance zone 293, and receives the far-distance UFH beacon signal. Then, the in-vehicle unit obtains the far-distance traffic information from the UHF beacon for the far distance.

The in-vehicle unit determines whether or not the vehicle has approached the far-distance zone 293, based on a result of position measurement performed by the GPS (Global Positioning System) of a car-navi and the traffic information distributed from the UHF beacon unit 112 installed at the intersection 193.

The far-distance traffic information indicates the range of each zone as the DSSS system information. The range of each zone is indicated by a distance from the intersection 193 or the UHF beacon unit 112, the radius of each zone, or absolute coordinates, etc.

Further, the far-distance traffic information includes road information on the far-distance zone 293. The in-vehicle unit measures a current position of the vehicle, based on the road information.

The road information includes coordinate values of objects on a road (such as a road sign, a road marking, and a white line), for example. A camera that captures an image of the road on which the vehicle is running, a gyroscope that measures an attitude angle of the vehicle, and a GPS receiver that performs GPS positioning are mounted on the vehicle.

First, the in-vehicle unit performs image processing of the image captured by the camera, and identifies an object on the road on the image. Next, the in-vehicle unit obtains a GPS positioning result (or measures the current position of the vehicle by dead reckoning based on a measurement value of the gyroscope and a measurement value of a speedometer).

Next, the in-vehicle unit calculates coordinates of an imaging range on the image captured by the camera, and calculates coordinates of the object on the road identified as being on the image, based on the current position of the vehicle, attitude angle of the vehicle, and a focal distance of the camera. The image captured by the camera is a projection of the object in a three-dimensional space onto a two-dimensional imaging surface that is orthogonal to a camera viewing direction and is separated from the center of the camera by the focal distance in the camera viewing direction. The center of the camera is determined, based on the current position of the vehicle and a mounting offset (relative position) of the camera from the center of the vehicle. The camera viewing direction is determined, based on the attitude angle of the vehicle and a mounting offset (relative attitude angle) of the camera from the vehicle. This allows calculation of a three-dimensional coordinate value of an object such as a road marking or a white line that is known to be located on a road surface based on the image when the current position of the vehicle, attitude angle of the vehicle, and the focal distance of the camera are determined.

Next, the in-vehicle unit extracts from road map information coordinate values of the object on the road on the image, based on the coordinates of the imaging range of the camera.

Then, the in-vehicle unit corrects the result of position measurement by the GPS or dead reckoning, based on a difference between the calculated coordinate values and the extracted values of the object on the road, and calculates the current position of the vehicle.

A self-position determining device that measures the current position of the vehicle by the above-mentioned method may be provided for the vehicle, in addition to the in-vehicle unit.

This allows the in-vehicle unit to identify the position of the vehicle even if the optical beacon unit 121 is not installed in the far-distance zone 293.

<S211: Intermediate-Distance Zone Entry Determination Process>

Next, the in-vehicle unit determines whether or not the vehicle has entered into the intermediate-distance zone 292, based on the current position of the vehicle and the range of the intermediate-distance zone 292 set in the far-distance traffic information.

During a period before the vehicle enters into the intermediate-distance zone 292, in other words during the period in which the vehicle is running in the far-distance zone 293, the far-distance traffic information reception process (in step S210) is executed.

<S220: Intermediate-Distance Traffic Information Reception Process>

When it is determined that the vehicle has entered into the intermediate-distance zone 292 in step S211, the in-vehicle unit switches the reception frequency to the frequency f2 for the intermediate-distance zone 292 set in the far-distance traffic information, and receives the intermediate-distance UHF beacon signal. Then, the in-vehicle unit obtains the intermediate-distance traffic information from the UHF beacon for the intermediate distance.

The road information on the intermediate-distance zone 292 and the traffic restriction information on the near-distance zone 291 are set in the intermediate-distance traffic information.

The in-vehicle unit displays various alerting messages on the screen of the car-navi or voice outputs the various alerting messages, based on the traffic restriction information on the near-distance zone 291.

Assume that the traffic restriction information indicates occurrence of a congestion, an accident, or a road construction work at the intersection 193, for example. Then, the in-vehicle unit displays or voice outputs an alerting message for preventing a rear-end collision in order to avoid the rear-end collision with a vehicle ahead that has approached the intersection 193 and has dropped its speed.

The in-vehicle unit measures the current position of the vehicle based on the road information on the intermediate-distance zone 292, as in the far-distance traffic information reception process (in step S210).

This arrangement allows the in-vehicle unit to identify the position of the vehicle even if the optical beacon unit 121 is not installed in the intermediate-distance zone 292.

<S221: Near-Distance Zone Entry Determination Process>

Next, the in-vehicle unit determines whether or not the vehicle has entered into the near-distance zone 291, based on the current position of the vehicle and the range of the near-distance zone 291 set in the far-distance traffic information.

During a period before the vehicle enters into the near-distance zone 291, in other words during the period in which the vehicle is running in the intermediate-distance zone 292, the intermediate-distance traffic information reception process (in step S220) is executed.

<S230: Near-Distance Traffic Information Reception Process>

When it is determined that the vehicle has entered into the near-distance zone 291 in step S221, the in-vehicle unit switches the reception frequency to the frequency f1 for the near-distance zone 291 set in the far-distance traffic information, and receives the near-distance UHF beacon signal. Then, the in-vehicle unit obtains the near-distance traffic information from the UHF beacon for the near distance.

Further, the in-vehicle unit receives the DSRC beacon signal from the DSRC beacon unit 111 installed at the intersection 193, thereby obtaining the traffic information from the DSRC beacon signal. The traffic information in the DSRC beacon is the near-distance traffic information. The traffic information in the DSRC beacon, the transmission rate of which is faster than that of the UHF beacon, includes an image, a sound, and additional information, in addition to the traffic information in the UHF beacon. However, the DSRC beacon has a strong rectilinearity and a low diffraction characteristic. Thus, when a blocking object is present between the DSRC beacon unit 111 and the vehicle, e.g., when a large-sized vehicle is running ahead, the DSRC beacon is not always received by the in-vehicle unit.

Further, when the vehicle is passing below the optical beacon unit 121 installed before the intersection 193, the in-vehicle unit receives the optical beacon signal and obtains the traffic information from the optical beacon.

The near-distance traffic information includes real time information on the intersection 193 such as presence or absence of an oncoming vehicle, presence or absence of a two-wheeled vehicle running behind, presence or absence of a pedestrian or a bicycle on a crosswalk, and traffic light control information.

Position information such as coordinate values and a running lane are set in the traffic information in the optical beacon.

<S231: DSRC Reception Determination Process>

The in-vehicle unit determines whether or not the DSRC beacon signal could be received from the DSRC beacon unit 111 in step S230.

<S232: DSRC Traffic Information Reception Process>

When it is determined in step S230 that the DSRC beacon signal has been received, the in-vehicle unit displays various messages on the screen of the car-navi or voice outputs the various messages, based on the traffic information in the DSRC beacon. The in-vehicle unit (or an automatic operation control device) may perform automatic operation control such as deceleration, stop, blinker illumination, or wheel steering, based on the traffic information in the DSRC beacon.

To take an example, the in-vehicle unit displays or voice outputs an alerting message for a right turn in order to prevent a right-turn collision with an oncoming vehicle when the right turn is made. Alternatively, the in-vehicle unit displays or voice outputs an alerting message for a left turn in order to avoid hit a two-wheeled vehicle when the left turn is made. Alternatively, the in-vehicle unit displays or voice outputs an alerting message indicating presence of a pedestrian or a bicycle when the pedestrian or the bicycle is present on a crosswalk when the right or left turn is made. Alternatively, the in-vehicle unit displays or voice outputs a message prompting deceleration before the color of the traffic light is changed to red.

Alternatively, the in-vehicle unit performs deceleration control of the vehicle when the color of the traffic light is changed to red, for example.

Further, the in-vehicle unit identifies the current position of the vehicle, based on position information obtained from the optical beacon signal.

<S233: UHF Traffic Information Reception Process>

When it is determined that the DSRC beacon signal has not been received in step S230, the in-vehicle unit displays or voice outputs various messages, or performs automatic operation control based on the traffic information in the UHF beacon signal, as in the DSRC traffic information reception process (in step S232).

Further, the in-vehicle unit measures the current position of the vehicle, based on the position information obtained from the optical beacon signal.

Then, when the vehicle that has passed through the intersection 193 enters into the intermediate-distance zone 292 from the near-distance zone 291, the intermediate-distance traffic information reception process (in step S220) is executed. When the vehicle enters into the far-distance zone 293 from the intermediate-distance zone 292, and when the vehicle enters into the far-distance zone 293 for the UHF beacon unit 112 installed at other intersection 193, the far-distance traffic information reception process (in step S210) is executed.

This may seamlessly provide different traffic information to the in-vehicle unit as if the information were provided by the single UHF beacon unit 112 in the single zone.

In Embodiment 2, the following safety driving support system 100 was described.

By utilizing the propagation loss characteristic of the UHF electric wave, communication between the UHF beacon unit 112 and the in-vehicle unit is allowed in a region (in a range of 100 m to 400 m away from the intersection 193) far from a reach region of the DSRC beacon signal.

This allows the vehicle in the far-distance region as well to receive the DSSS service such as rear-end collision prevention service.

A communication region of the UHF beacon unit 112 is concentrically divided (into the near-distance zone 291, the intermediate-distance zone 292, and the far-distance zone 293). Then, by using a different frequency for each concentric region, different information is provided to the in-vehicle unit.

This allows a seamless service (in which a plurality of services may be used as if a same service were used) to be provided to the vehicle.

The in-vehicle unit grasps the position of the vehicle on which the in-vehicle unit is mounted, based on the road information provided through the UHF beacon signal and a result of position measurement of the vehicle by the GPS mounted on the vehicle.

With this arrangement, the in-vehicle unit can appreciate the position of the vehicle on which the in-vehicle unit is mounted, even in the far-distance zone 293 in which the optical beacon unit 121 is not installed.

Embodiment 3

In Embodiment 3, the following feature will be described. That is, wherever a vehicle is running, the in-vehicle unit may receive the UHF beacon signal from at least one of the UHF beacon units 112 installed at the different intersections 193 to obtain the traffic information without interference, in the driving safety support systems 100 described in at least one of Embodiments 1 and 2.

FIG. 9 is a diagram showing an arrangement relationship and transmission frequencies of the UHF beacon units 112 in Embodiment 3.

The arrangement relationship and the transmission frequencies of the UHF beacon units 112 in Embodiment 3 will be described below, based on FIG. 9.

The UHF beacon units 112 (112a to 112d) that are mutually adjacent are arranged at locations (at the intersections 193) which are separated in such a manner that at least one portions of far-distance zones 293 (293a to 293d) mutually overlap (communication regions overlap) and the intermediate-distance zones 292 do not mutually overlap.

Assume that a range of a radius of 200 meters from the UHF beacon unit 112 is the intermediate-distance zone 292 and a range of a radius of 400 meters from the UHF beacon unit 112 is the far-distance zone 293, for example. Then, the respective UHF beacon units 112 are arranged at locations that are mutually separated by 400 to 800 meters in such a manner that at least one portions of the far-distance zones 293 mutually overlap.

Further, different frequencies are assigned to the UHF beacons for the far distance of the respective UHF beacon units 112 so that the UHF beacon signals do not interfere (interfere) in an overlap portion of the zones.

The UHF beacon units 112 are arranged so that the intermediate-distance zones 292 and the near-distance zones 291 do not overlap. Thus, mutually common frequencies are respectively assigned to the UHF beacon for the intermediate distance and the UHF beacon for the near distance.

The frequency f1 is assigned to UHF beacon for the near distance and the frequency f2 is assigned to the UHF beacon for the intermediate distance, in each of the UHF beacon unit 112a, UHF beacon unit 112b, UHF beacon unit 112c, and UHF beacon unit 112d, for example.

The frequency f3 is assigned to the UHF beacon for the far distance in the UHF beacon unit 112a, a frequency f4 is assigned to the UHF beacon for the far distance in the UHF beacon unit 112b, a frequency f5 is assigned to the UHF beacon for the far distance in the UHF beacon unit 112c, and a frequency f6 is assigned to the UHF beacon for the far distance in the UHF beacon unit 112d.

The frequencies f1 to f6 are information set in advance for the respective UHF beacon units 112.

The UHF beacon units 112 (illustration of which is omitted) respectively disposed around the UHF beacon units 112a to 112d are similarly disposed, and the UHF beacon frequencies are similarly assigned to the UHF beacon units 112.

Referring to FIG. 9, for example, frequencies that are the same as the frequencies for the UHF beacon unit 112d, should be assigned to the UHF beacon unit 112 disposed upwardly adjacent to the UHF beacon unit 112b in such a manner that only the far-distance zones 293 overlap.

Further referring to FIG. 9, for example frequencies that are the same as the frequencies for the UHF beacon units 112a, should be assigned to the UHF beacon unit 112 disposed adjacent to the right of the UHF beacon unit 112b in such a manner that only the far-distance zones 293 overlap.

Further referring to FIG. 9, for example frequencies that are the same as the frequencies for the UHF beacon units 112c, should be assigned to the UHF beacon unit 112 adjacent to the UHF beacon unit 112b in a direction diagonally upward toward the right in such a manner that only the far-distance zones 293 overlap.

Herein, the UHF beacon device disposed downwardly adjacent to the UHF beacon unit 112b is set to the UHF beacon unit 112d. The UHF beacon device disposed adjacent to the left of the UHF beacon unit 112b is treated as the UHF beacon unit 112a. The UHF beacon device adjacent to the UHF beacon unit 112b in a direction diagonally downward to the left is set to the UHF beacon unit 112c.

FIG. 10 is a diagram showing frequency bands assigned to the UHF beacon units 112 in Embodiment 3.

The frequency bands (channels) that are assigned to the UHF beacon units 112 in the Embodiment 3 will be described below, based on FIG. 10.

A frequency bandwidth used in the DSSS is set to approximately 10 MHz from approximately 715.0 to 725.0 MHz (mega-hertz), for example. This frequency bandwidth is a bandwidth used in terrestrial analog TV broadcasting, and may be used after completion of the terrestrial analog broadcasting on 25 Jul. 2012.

Further, guard bands each of approximately 5.0 MHz (710.0 to 715.0 MHz and 725.0 to 730.0 MHz) are provided before and after the frequency band of 715.0 to 725.0 MHz in order to avoid interference with another system that uses a frequency band in the vicinity of 715.0 to 725.0 MHz.

As shown FIG. 9, the six frequency bands f1 to f6 are needed so as to avoid interference of the UHF beacons for the respective zones. Then, the frequency bandwidth of 10.0 MHz used in the DSSS is divided into six frequency bandwidths that do not mutually overlap. Then, it is assumed that the frequencies f1 to f6 described above denote the frequency bands f1 to f6 each having a predetermined width.

A bandwidth of 1.5 MHz is assigned to each of the frequency bands f1 to f6, and a bandwidth of 0.2 MHz is assigned to a gap (interval) between the respective frequency bands, for example.

With this arrangement, a frequency band of approximately 715.0 to 716.5 MHz, a frequency band of approximately 716.7 to 718.2 MHz, a frequency band of approximately 718.4 to 719.9 MHz, a frequency band of approximately 720.1 to 721.6 MHz, a frequency band of approximately 721.8 to 723.3 MHz, and a frequency band of approximately 723.5 to 725.0 MHz are respectively assigned to the frequency bands f1 to f6.

The respective center frequencies of the frequency bands f1 to f6 are approximately 715.75 MHz, approximately 717.45 MHz, approximately 719.15 MHz, approximately 720.85 MHz, approximately 722.55 MHz, and approximately 724.25 MHz.

In Embodiment 3, the driving safety support systems 100 as follows were described.

The frequencies for the intermediate-distance zone 292 (intermediate region) and the near-distance zone 291 (inner region) of the communication region of each of the UHF beacon units 112 are set to be the same among the UHF beacon units 112. The frequency for the far-distance zone 293 (outer region) is set to be different from the frequency for the outer region of an adjacent UHF beacon unit 112.

Such frequency arrangement may prevent frequency interference even if the UHF beacon units 112 are disposed in such a manner that the communication regions of the UHF beacon units 112 overlap.

Embodiment 4

In embodiment 4, the following feature will be described. That is, the in-vehicle unit transmits the UHF beacon signal to notify the UHF beacon unit 112 of warning information detected by the vehicle, and the UHF beacon unit 112 distributes the warning information notified from the in-vehicle unit to another vehicle in the driving safety support systems 100 described in at least one of Embodiments 1 to 3.

When an accident has occurred ahead, for example, the driver depresses a hazard button (or a warning button provided dedicatedly) (an example of an input device).

When the hazard button has been depressed, the in-vehicle unit sets the warning information indicating warning, and transmits the UHF beacon signal.

The UHF beacon unit 112 that has received the UHF beacon signal transmitted from the in-vehicle unit sets the warning information, and transmits each UHF beacon signal for the near-distance zone 291, intermediate-distance zone 292, and a far-distance zone 293.

This allows provision of the warning information (such as accident information) detected by the in-vehicle unit to a vehicle running in the far-distance zone 293 as well.

The in-vehicle unit transmits the UHF beacon signal, using a current reception frequency, for example.

In a system where the UHF beacon unit 112 distributes traffic information to one near-distance zone and one far-distance zone, the in-vehicle unit transmits the UHF beacon signal using the frequency f2 for the intermediate distance that is not used, for example.

The in-vehicle unit may transmit the UHF beacon signal using a different dedicated frequency (or beacon of a different frequency band), for example.

In Embodiment 4, the driving safety support systems 100 as follows were described.

When an unexpected accident has occurred, a certain vehicle provides emergency information (warning information) to all vehicles through the UHF beacon unit 112, using a dedicated frequency channel.

This allows notification of occurrence of the unexpected accident even to a vehicle in the far-distance zone 293.

Embodiment 5

In Embodiment 5, description will be directed to a method of disposing the DSRC beacon units 111 in the driving safety support systems 100 described in at least one of Embodiments 1 to 4. Each of the DSRC beacon units 111 transmits the DSRC beacon signal having a stronger rectilinearity than the UHF beacon.

Embodiment Example 5-1

FIG. 11 is a diagram showing a first method of disposing the DSRC beacon units 111 in Embodiment 5.

The first method of disposing the DSRC beacon units 111 in Embodiment 5 will be described below, based on FIG. 11.

Two DSRC beacon units 111 (111a, 111b) are disposed at positions generally facing each other across one road (such as a sub-road 192), and are installed in diagonal directions that cross each other, at an intersection 193 of the right-angle crossroads.

Then, the respective DSRC beacon units 111 transmit the DSRC beacons to the intersection in the diagonal directions that cross each other.

The DSRC beacon unit 111b is installed at a location before the intersection that is approached from an approaching traffic path 2 of a main road 191, for example. When a vehicle 199c turns right from an approaching traffic path 0 of the main road 191 toward a departing traffic path 3 of a sub-road 192 and enters into a intersection, the DSRC beacon unit 111b transmits a DSRC beacon from a direction directly opposite to (facing) the vehicle 199c.

Since the electric field strength of a DSRC beacon that propagates from the directly opposite direction is high, the DSRC beacon unit 111b can supply a DSRC beacon signal with the traffic information set therein to the in-vehicle unit of the vehicle 199c with more reliability.

Assume that the roadside control unit 130 has generated traffic information indicating presence of a two-wheeled vehicle 199d that goes straight on the main road 191 from the approaching traffic path 2 toward a departing traffic path 0, based on information from the optical beacon unit 121, for example. Then, the DSRC beacon signal indicating this traffic information is transmitted from the DSRC beacon unit 111b, and this traffic information is received by the in-vehicle unit of the vehicle 199c that has turned right from the approaching traffic path 0 of the main road 191 toward the departing traffic path 3 of the sub-road 192. The in-vehicle unit that has received the DSRC beacon signal displays or voice outputs the message for preventing a right-turn accident, based on the traffic information set in the DSRC beacon signal, and alerts the driver. With this arrangement, the right-turn accident between the vehicle 199c and the two-wheel vehicle 199d may be prevented.

Similarly, the DSRC beacon unit 111a is installed at a location before the intersection that is approached from an approaching traffic path 3 of the sub-road 192. When a vehicle 199 (illustration of which is omitted) turns right from an approaching traffic path 1 of the sub-road 192 toward a departing traffic path 0 of the main road 191 and enters into a intersection, the DSRC beacon unit 111a transmits the DSRC beacon signal from a direction directly opposite to (facing) the vehicle 199, thereby preventing the right-turn accident of the vehicle 199.

The DSRC beacon signals from the DSRC beacon unit 111a and the DSRC beacon unit 111b are not received by the in-vehicle unit of a vehicle turning right from a specific traffic path alone, and are received also by in-vehicle units of a vehicle running straight, a vehicle turning left, and a vehicle turning right from another traffic path.

The traffic information set in the DSRC beacon signals from the DSRC beacon units 111a and 111b is not limited to the traffic information for preventing a right-turn accident.

The DSRC beacon unit 111a and DSRC beacon unit 111b transmit the different DSRC beacon signals using the different frequency bands in order to prevent interference.

A 5.8 GHz (giga hertz) band is used for the DSRC beacon.

The 5.8 GHz band is divided into seven frequency bands (F1 to F7) with 5.795 GHz (F1), 5.805 GHz (F2), 5.800 GHz (F3), 5.790 GHz (F4), 5.785 GHz (F5), 5.780 GHz (F6), and 5.775 GHz (F7) used as respective center frequencies of the frequency bands (F1 to F7).

The frequency bands F1 and F2 are used for ETC (Electronic Toll Collection).

The DSRC beacon unit 111a transmits the DSRC beacon signal using the frequency band F3, while the DSRC beacon unit 111b transmits the DSRC beacon signal using the frequency band F4, for example.

FIG. 12 is a first arrangement diagram of the DSRC beacon units 111 in Embodiment 5.

As shown in FIG. 12, each of the DSRC beacon units 111a and 111b is arranged at an intersection (e.g. at every other intersection).

The DSRC beacon unit 111a transmits the DSRC beacon signal using the frequency band F3, thereby providing traffic information to the in-vehicle unit of a vehicle running on a lane indicated by a dotted line.

The DSRC beacon unit 111b transmits the DSRC beacon signal using the frequency band F4, thereby providing traffic information to the in-vehicle unit of a vehicle running on a lane indicated by a dashed line.

Embodiment Example 5-2

FIG. 13 is a diagram showing a second method of disposing the DSRC beacon units 111 in Embodiment 5.

The second method of disposing the DSRC beacon units 111 in Embodiment 5 will be described below, based on FIG. 13.

At the intersection 193 of the right-angle crossroads, two DSRC beacon units 111 (111a, 111b) are disposed at corner portions in a diagonal direction and are disposed facing each other.

Then, the respective DSRC beacon units 111 transmit DSRC beacon signals to the intersection in diagonal directions facing each other.

The DSRC beacon unit 111b is installed at a location before the intersection 193, approached from the approaching traffic path 2 of the main road 191, for example. When a vehicle 199 turns right from the approaching traffic path 0 of the main road 191 toward the departing traffic path 3 of the sub-road 192 and enters into a intersection, the DSRC beacon unit 111b transmits a DSRC beacon from a direction directly opposite to (facing) the vehicle 199, thereby preventing the right-turn accident of the vehicle 199.

Similarly, the DSRC beacon unit 111a is installed at a location before the intersection, approached from the approaching traffic path 0 of the main road 191. When a vehicle 199 turns right from the approaching traffic path 2 of the main road 191 toward a departing traffic path 1 of the sub-road 192 and enters into a intersection, the DSRC beacon unit 111a transmits the DSRC beacon from a direction directly opposite to (facing) the vehicle 199, thereby preventing the right-turn accident of the vehicle 199.

The DSRC beacon signals from the DSRC beacon unit 111a and the DSRC beacon unit 111b are not received by the in-vehicle unit of a vehicle turning right from a specific traffic path alone, and are received also by in-vehicle units of a vehicle running straight, a vehicle turning left, and a vehicle turning right from another traffic path.

The traffic information set in DSRC beacon signals from the DSRC beacon units 111a and 111b is not limited to the traffic information for preventing a right-turn accident.

FIG. 14 is a second arrangement diagram of the DSRC beacon units 111 in Embodiment 5.

As shown in FIG. 14, each of the DSRC beacon units 111a and 111b is arranged at an intersection (e.g. at every other intersection).

The DSRC beacon unit 111a transmits the DSRC beacon signal using the frequency band F3, thereby providing traffic information to the in-vehicle unit of a vehicle running on a lane indicated by a dotted line.

The DSRC beacon unit 111b transmits the DSRC beacon signal using the frequency band F4, thereby providing the traffic information to the in-vehicle unit of a vehicle running on a lane indicated by a dashed line.

Embodiment Example 5-3

FIG. 15 is a diagram showing a third method of disposing the DSRC beacon units 111 in Embodiment 5.

The third method of disposing the DSRC beacon units 111 in Embodiment 5 will be described below, based on FIG. 15.

At the intersection 193 of the right-angle crossroads, two DSRC beacon units 111 (111a, 111b) are disposed at the corner portions in the diagonal direction and are respectively disposed toward the approaching traffic paths (0, 2) of the main road 191.

Then, each DSRC beacon unit 111 transmits the DSRC beacon signal to the approaching traffic path of the main road 191.

The DSRC beacon unit 111a is installed at a location before the intersection, approached from the approaching traffic path 0 of the main road 191, for example, and transmits a DSRC beacon signal to the approaching traffic path 0 of the main road 191.

When the roadside control unit 130 generates traffic information indicating presence of the two-wheeled vehicle 199d running on a left-turn and straight-through lane of the main road 191 based on information from the optical beacon unit 121, the DSRC beacon signal indicating this traffic information is transmitted from the DSRC beacon unit 111a, and this traffic information is received by the in-vehicle unit of the vehicle 199c which will turn left from the approaching traffic path 0 of the main road 191 toward the departing traffic path 1 of the sub-road 192. The in-vehicle unit that has received the DSRC beacon signal displays or voice outputs a message for preventing a turn-left hit accident based on the traffic information set in the DSRC beacon signal, thereby alerting the driver. With this arrangement, when the vehicle 199c turns left, cutting off of the two-wheeled vehicle 199d by the vehicle 199c can be prevented.

Similarly, the DSRC beacon unit 111b is installed at a location before the intersection, approached from the approaching traffic path 2 of the main road 191, and transmits a DSRC beacon signal to the approaching traffic path 2 of the main road 191, thereby preventing the left-turn hit accident of a vehicle 199.

The DSRC beacon signals from the DSRC beacon unit 111a and the DSRC beacon unit 111b are not received by the in-vehicle unit of a left-turning vehicle alone, and are received also by in-vehicle units of a vehicle running straight and a right-turning vehicle.

Traffic information set in DSRC beacon signals from the DSRC beacon units 111a and 111b are not limited to the traffic information for preventing a left-turn hit accident.

As traffic information set in DSRC beacon signals from the DSRC beacon units 111a and 111b, information on a person walking on a crossroad or a bicycle running on the crossroad when the vehicle turns left across the crossroad may be set.

FIG. 16 is a third arrangement diagram of the DSRC beacon units 111 in Embodiment 5.

As shown in FIG. 16, each of the DSRC beacon units 111a and 111b are arranged at each of intersections (e.g. at every other intersection).

The DSRC beacon unit 111a transmits a DSRC beacon signal using the frequency band F3, thereby providing traffic information to the in-vehicle unit of a vehicle running on a lane indicated by a dotted line.

The DSRC beacon unit 111b transmits a DSRC beacon signal using the frequency band F4, thereby providing traffic information to the in-vehicle unit of a vehicle running on a lane indicated by a dashed line.

DSRC beacon units 111 may be arranged by an arrangement method obtained by combination of Embodiments 5-1 to 5-3.

UHF beacon units 112 may be arranged by the arrangement method in each of Embodiments 5-1 to 5-3, or the arrangement method obtained by combination of Embodiments 5-1 to 5-3.

DESCRIPTION OF REFERENCE SYMBOLS

Figure 1:
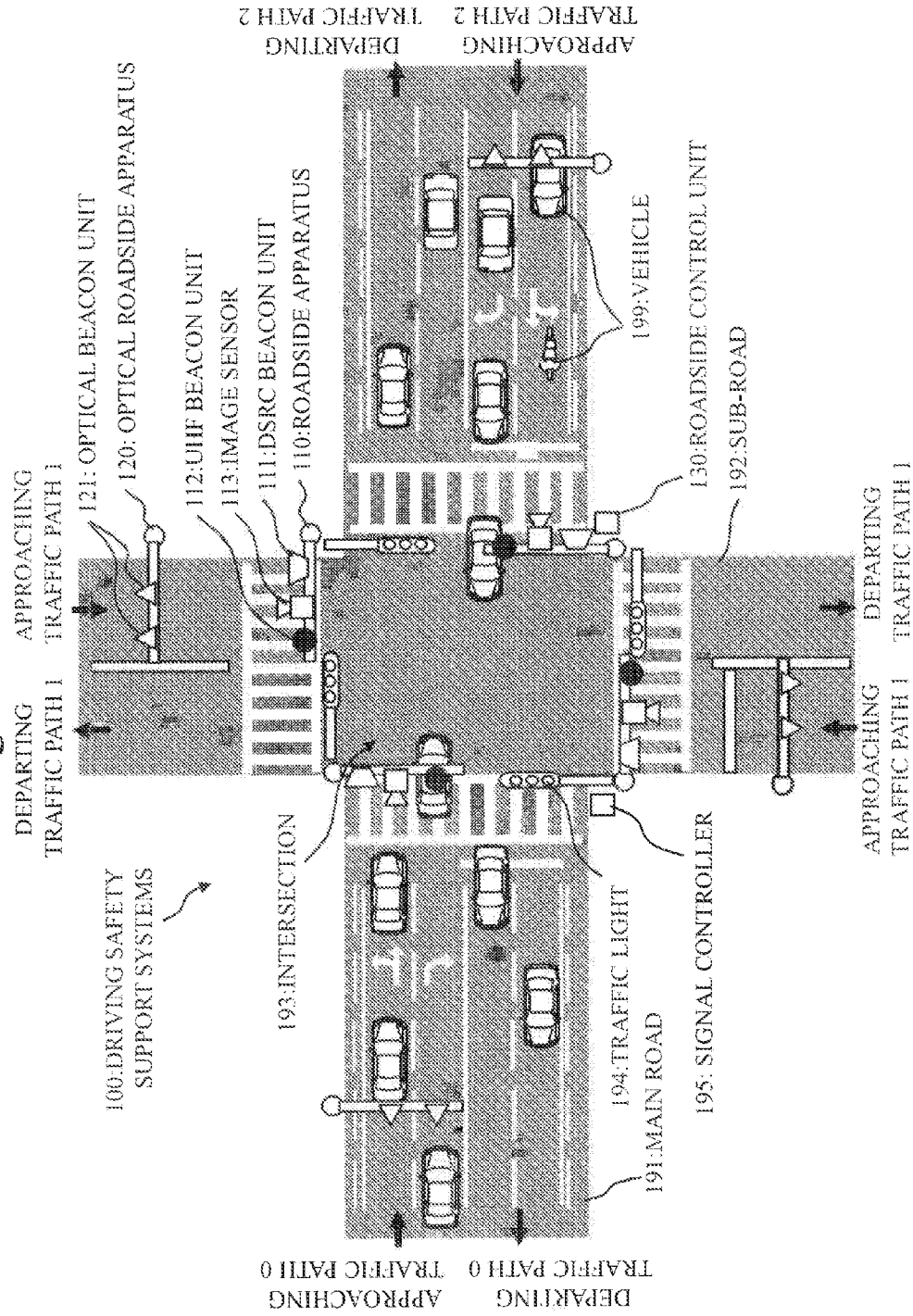
FIG. 1 is a diagram showing a configuration of driving safety support systems 100 in Embodiment 1.
Figure 2:
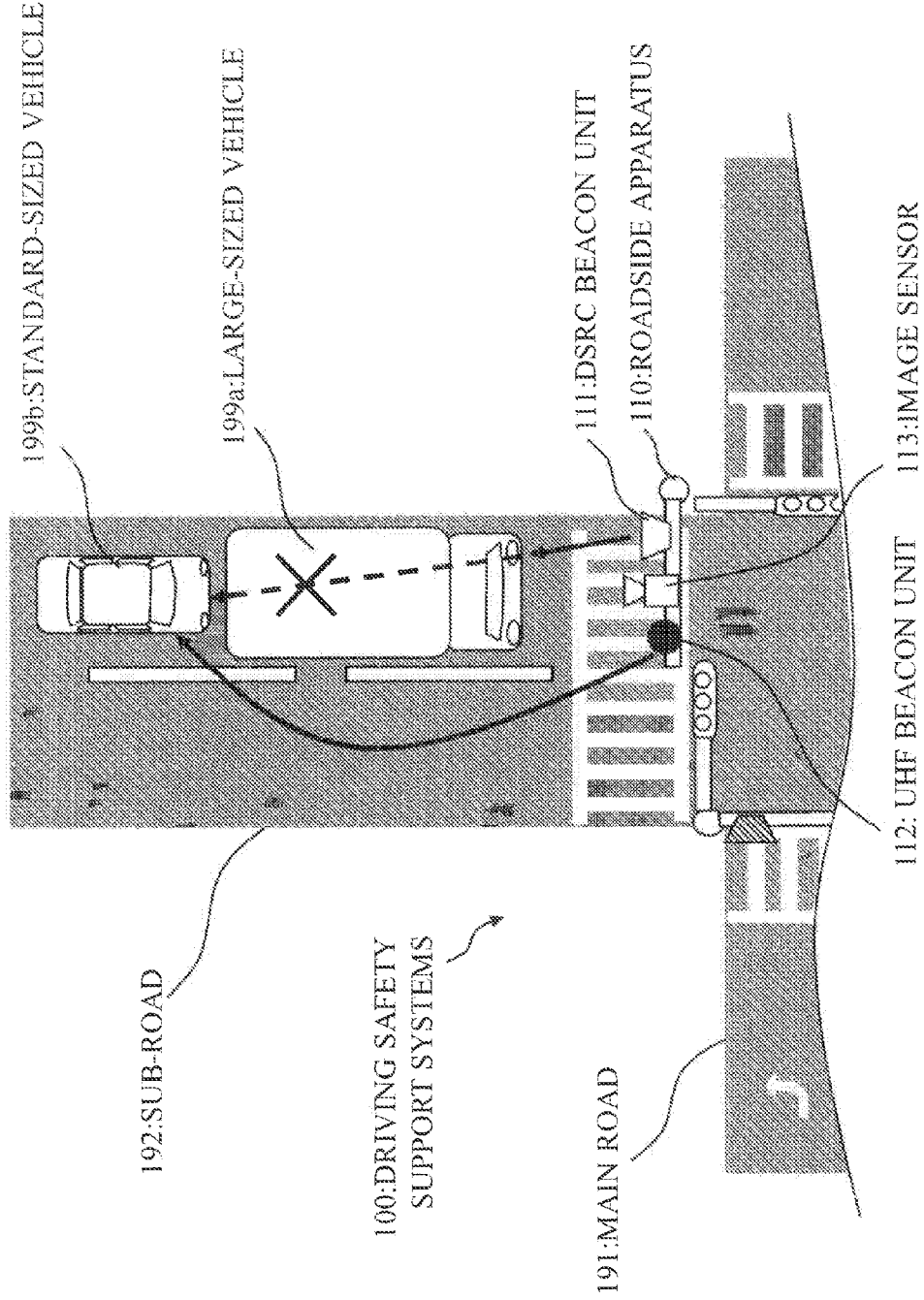
FIG. 2 is a diagram showing distribution of traffic information by the driving safety support systems 100 at a time of shadowing in Embodiment 1.
Figure 3:
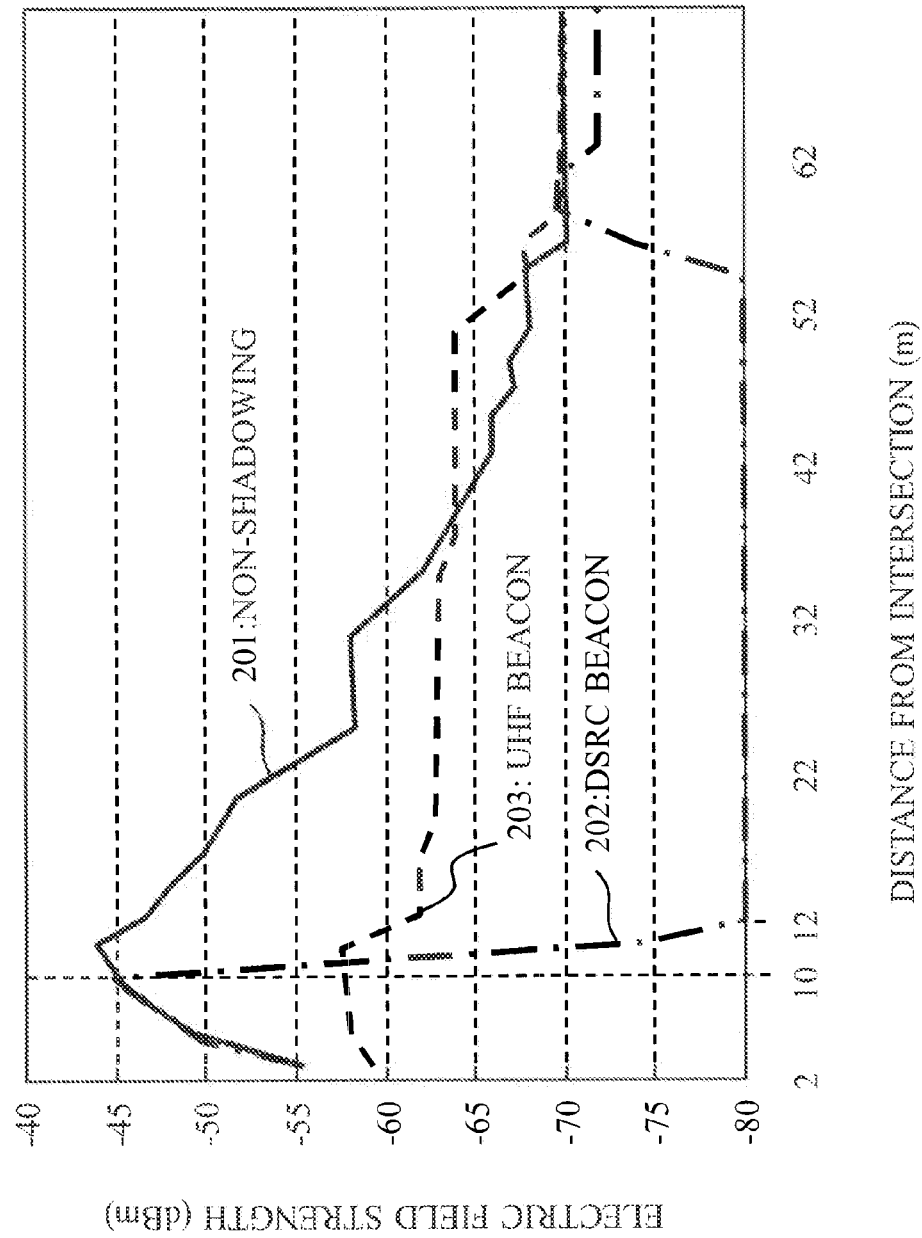
FIG. 3 is a graph showing an electric field strength characteristic of a DSRC beacon at a time of non-shadowing (non-shadowing 201), an electric field strength characteristic of a DSRC beacon at a time of shadowing (DSRC beacon 202), and an electric field strength characteristic of a UHF beacon at the time of shadowing (UHF beacon 203)
Figure 4:
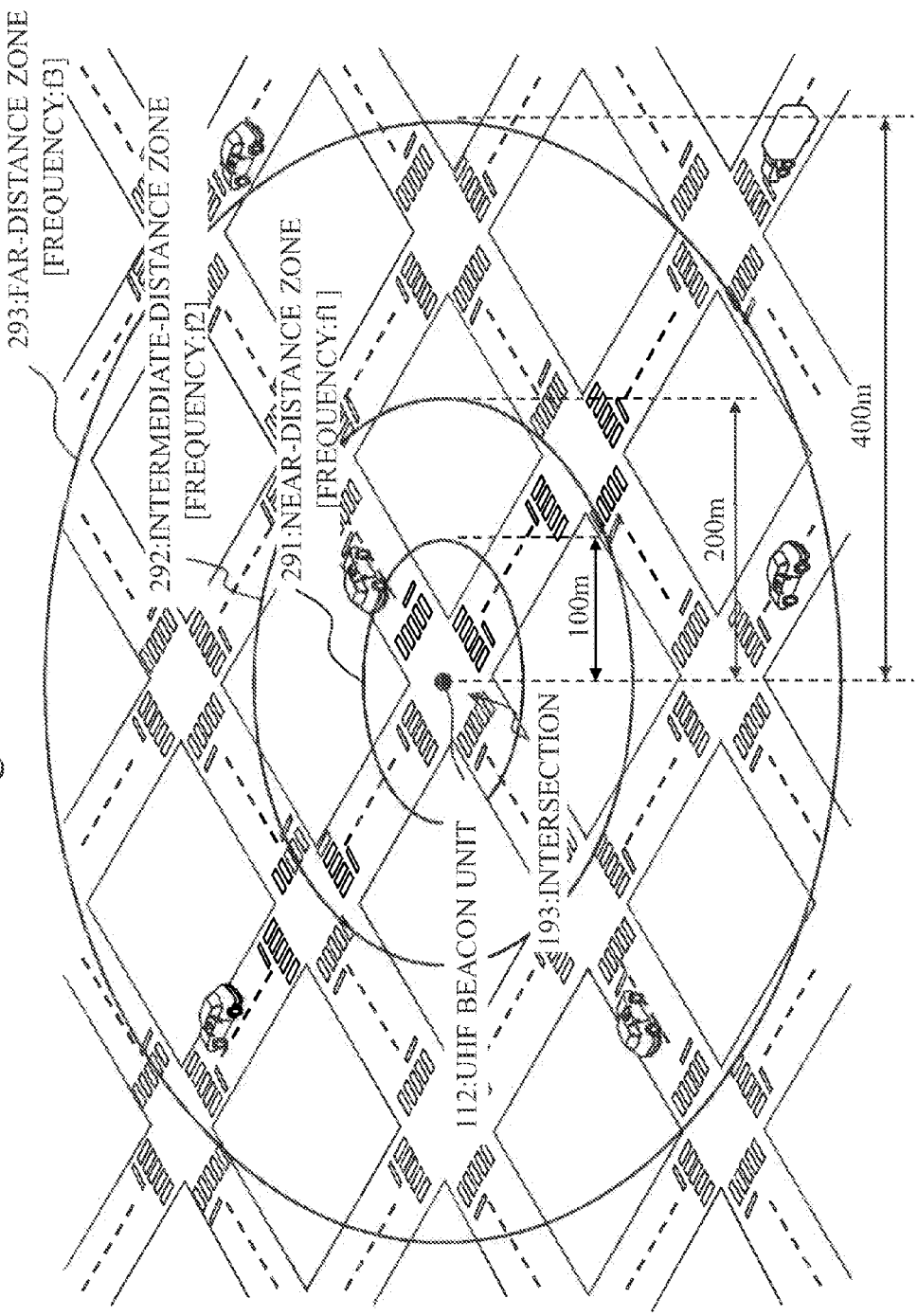
FIG. 4 is a diagram showing a distribution zone of a information by a UHF beacon in Embodiment 2.
Figure 5:
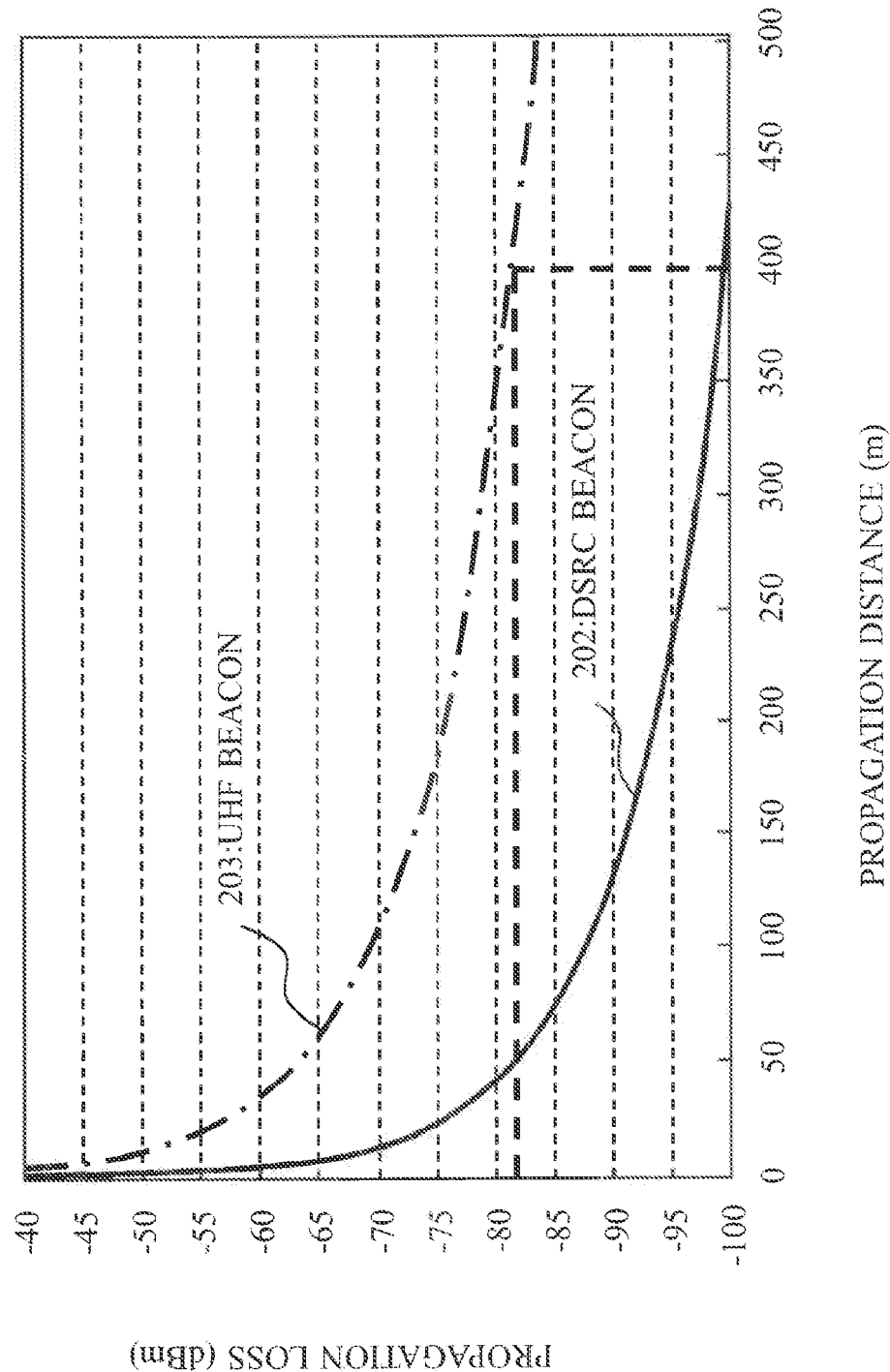
FIG. 5 is a graph showing propagation loss characteristics of a DSRC beacon 202 and a UHF beacon 203.
Figure 6:
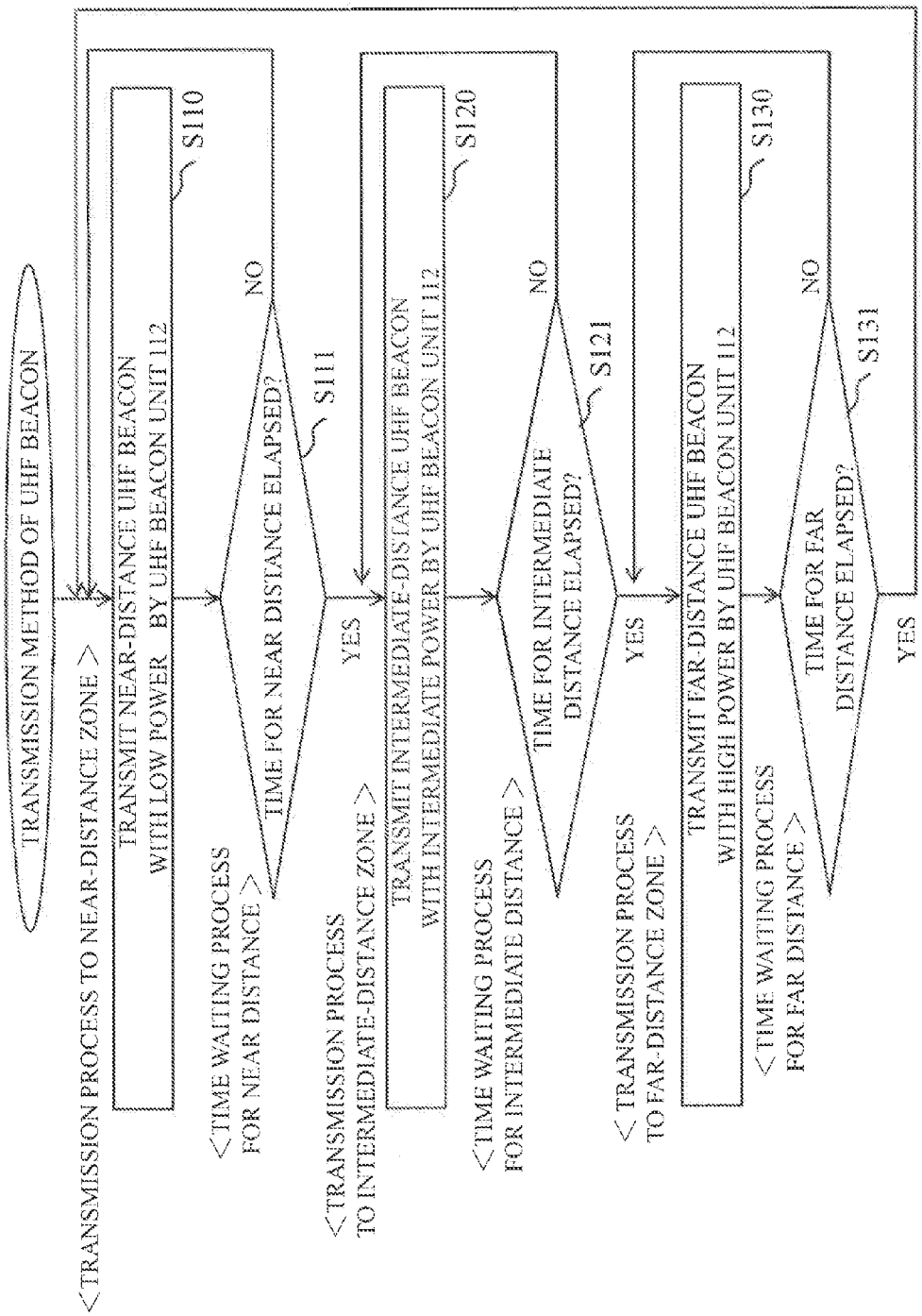
FIG. 6 is a flowchart showing a transmission method of the UHF beacon signal by a UHF beacon unit 112 in Embodiment 2.
Figure 7:
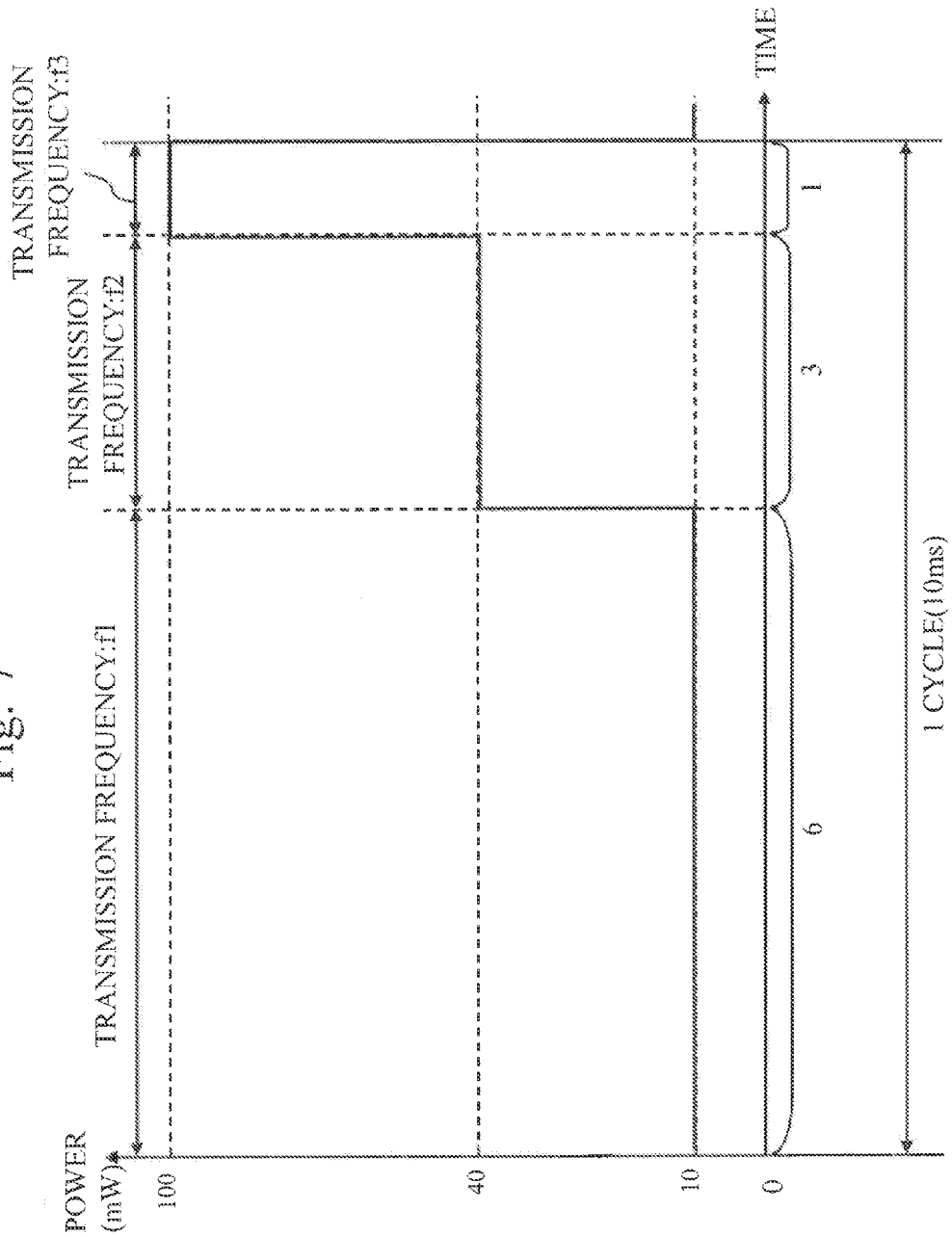
FIG. 7 is a graph showing time division, frequency division, and transmission output powers of a UHF beacon signals in Embodiment 2.
Figure 8:
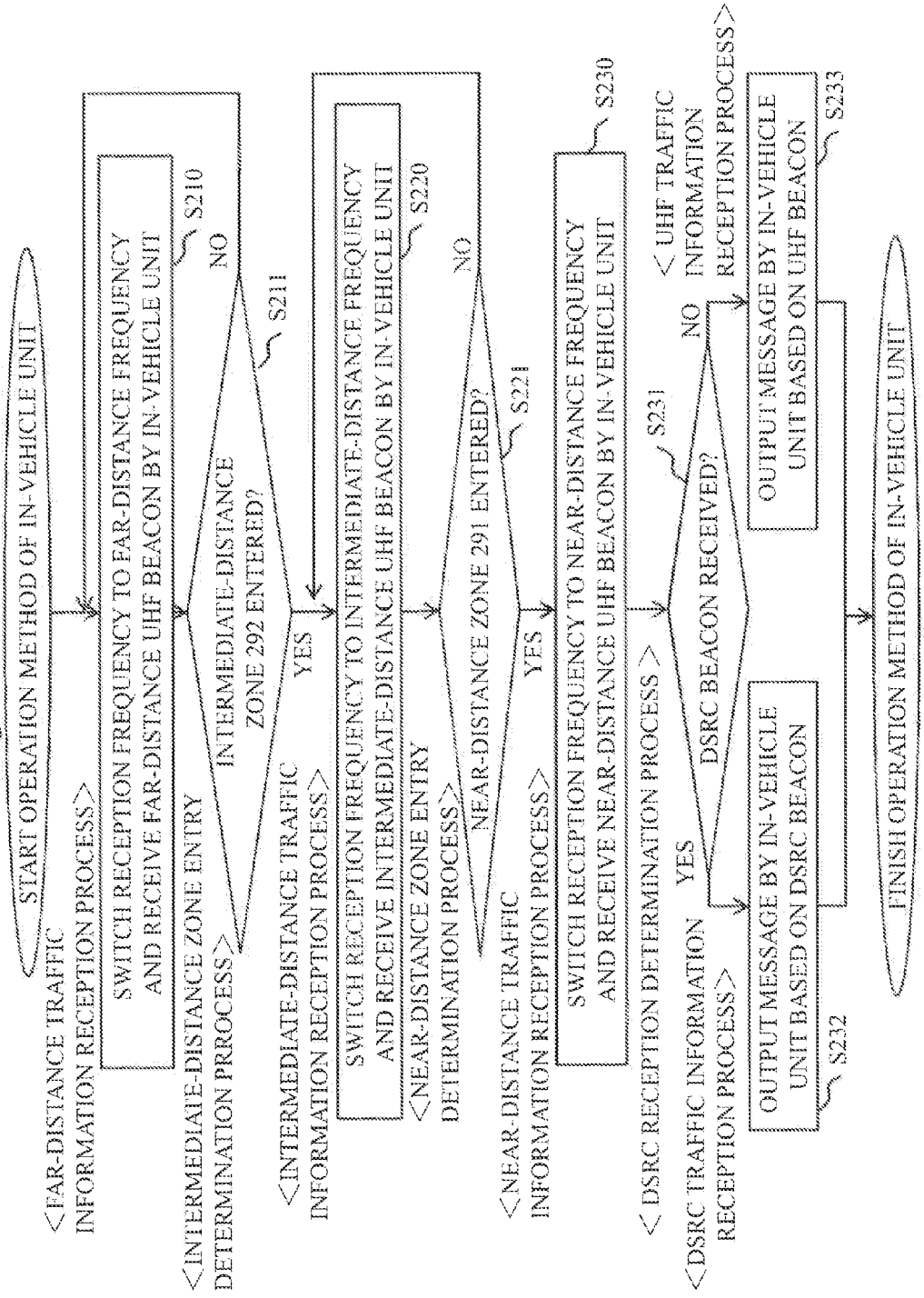
FIG. 8 is a flowchart showing an operation method of an in-vehicle unit in Embodiment 2.
Figure 9:
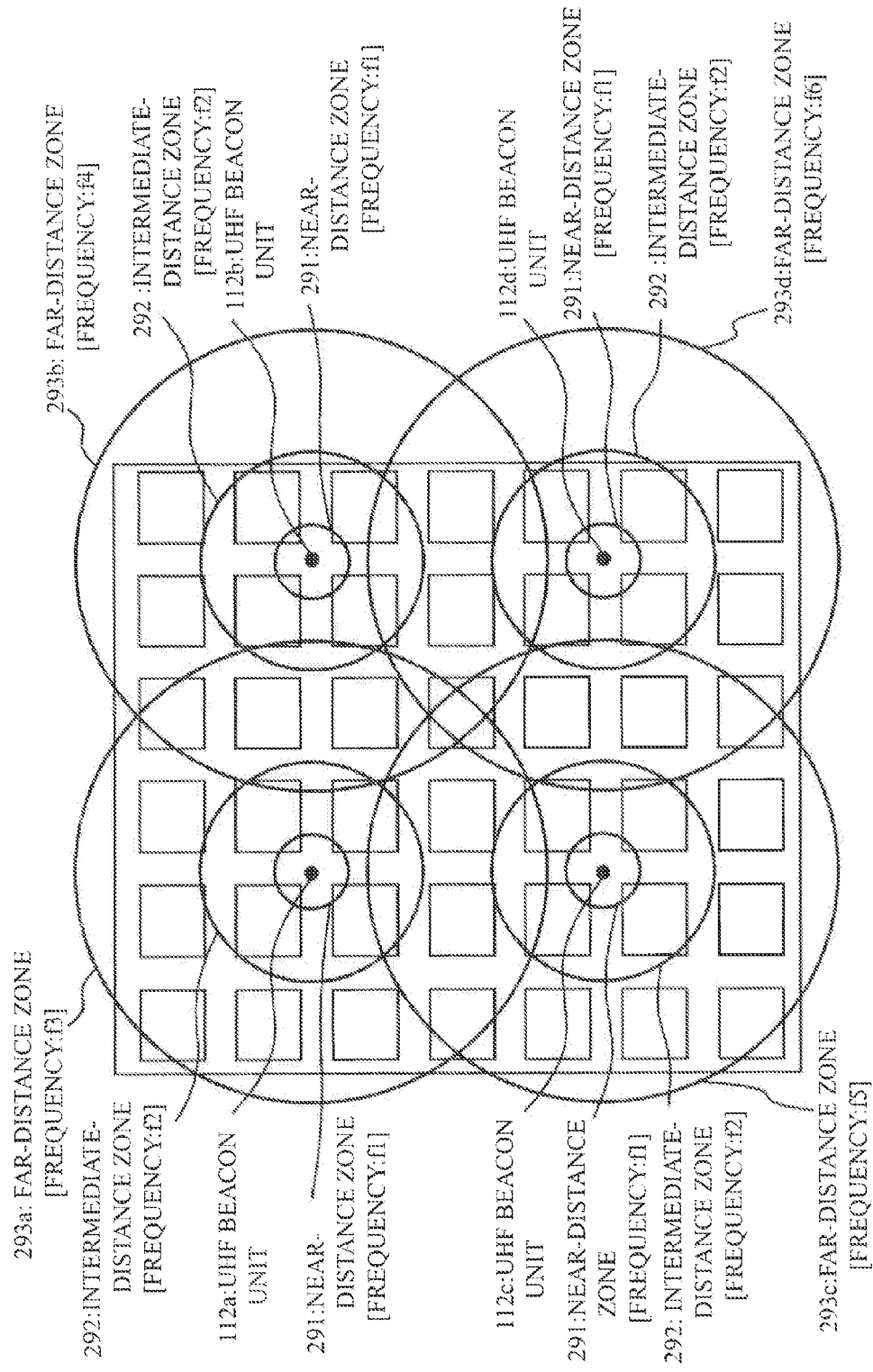
FIG. 9 is a diagram showing an arrangement relationship and transmission frequencies of UHF beacon units 112 in Embodiment 3.
Figure 10:
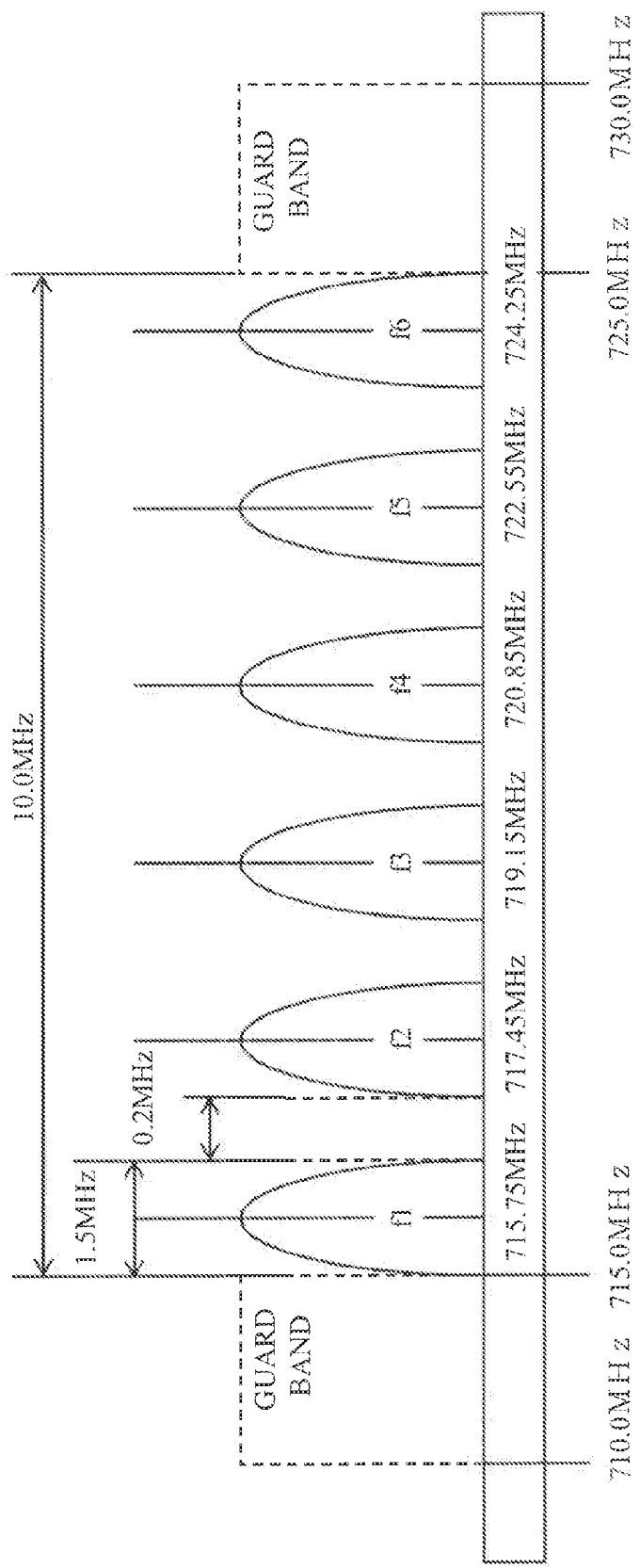
FIG. 10 is a diagram showing frequency bands assigned to a UHF beacon units 112 in Embodiment 3.
Figure 11:
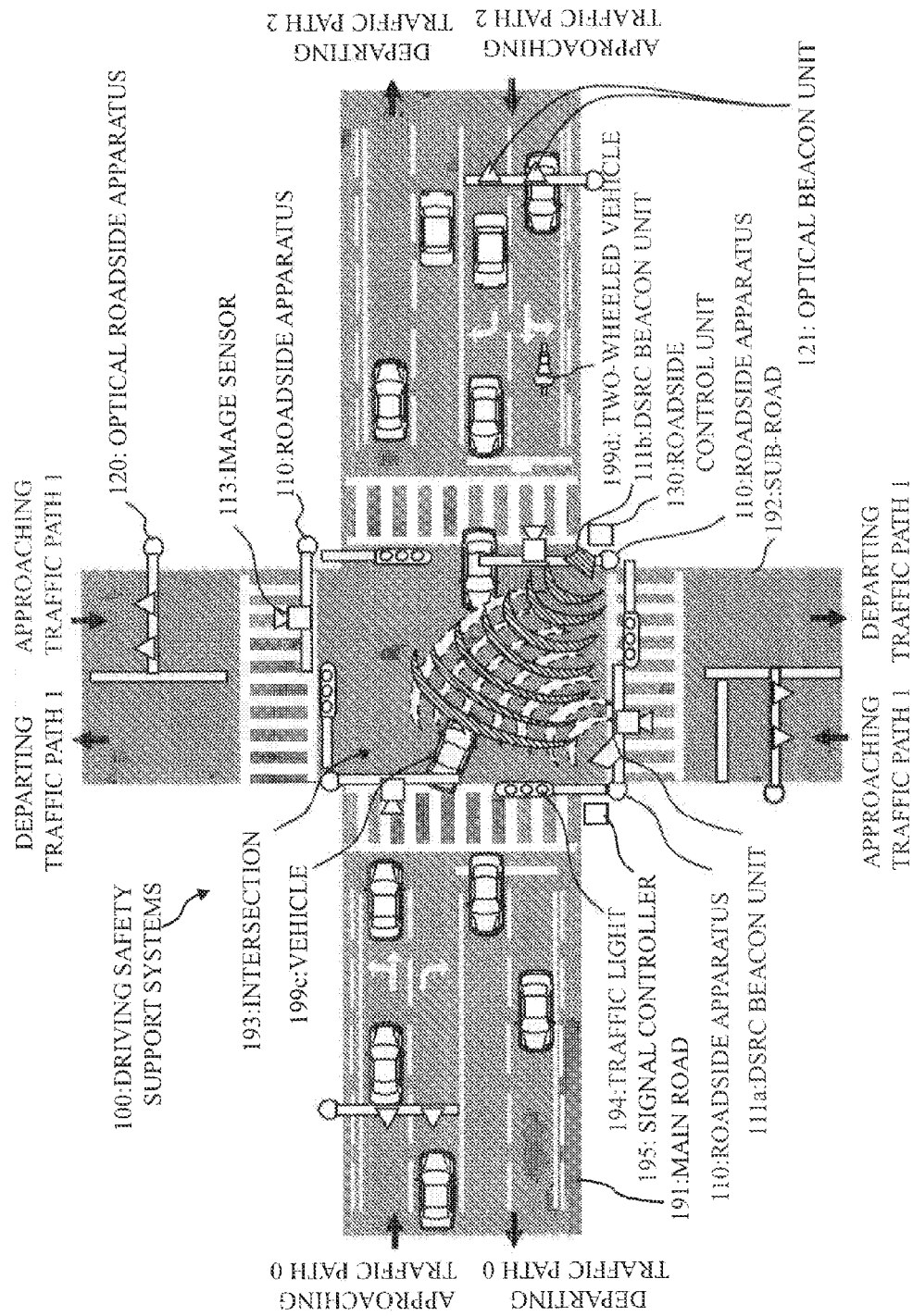
FIG. 11 is a diagram showing a first method of disposing DSRC beacon units 111 in Embodiment 5.
Figure 12:
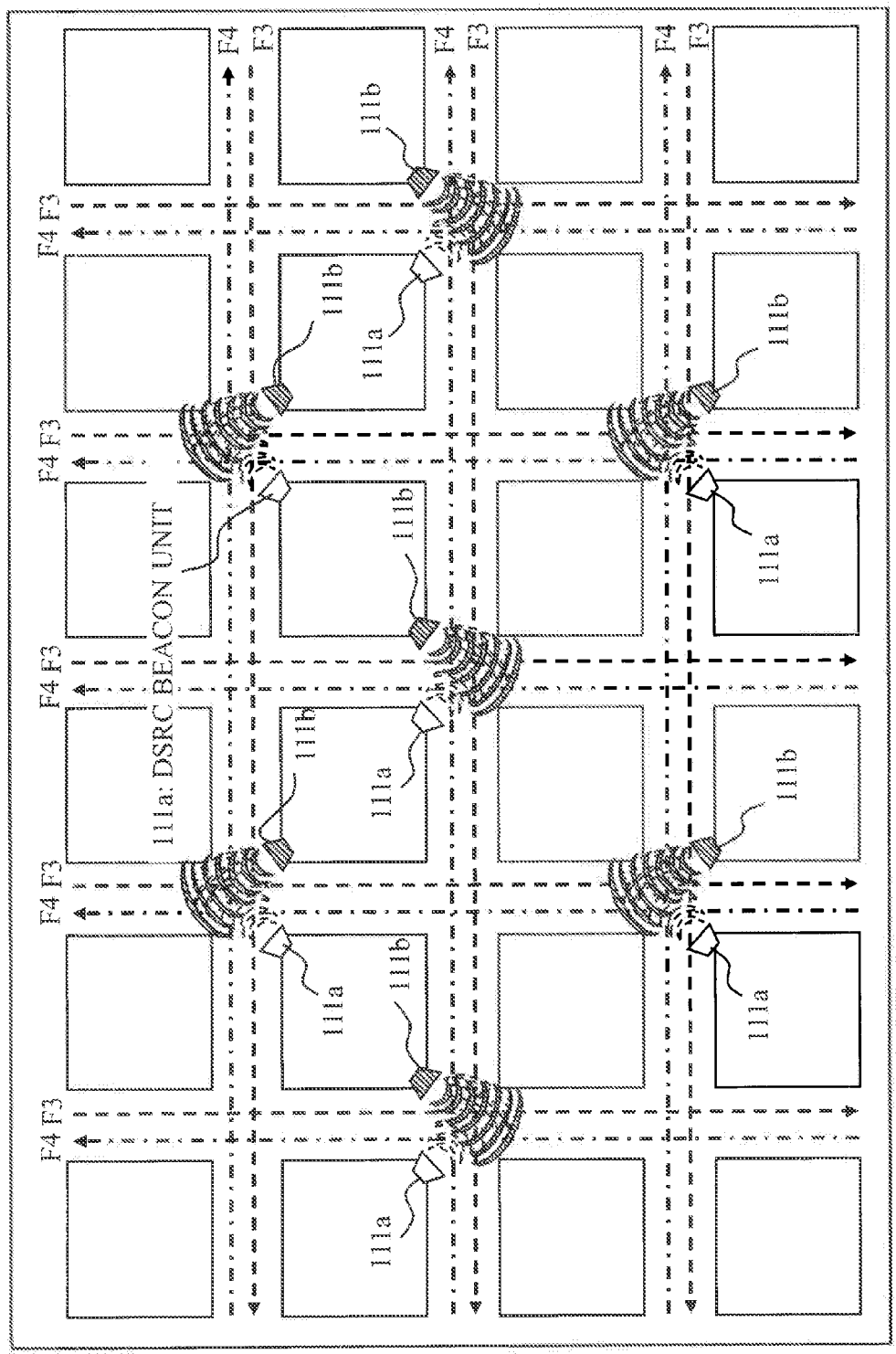
FIG. 12 is a first arrangement diagram of DSRC beacon units 111 in Embodiment 5.
Figure 13:
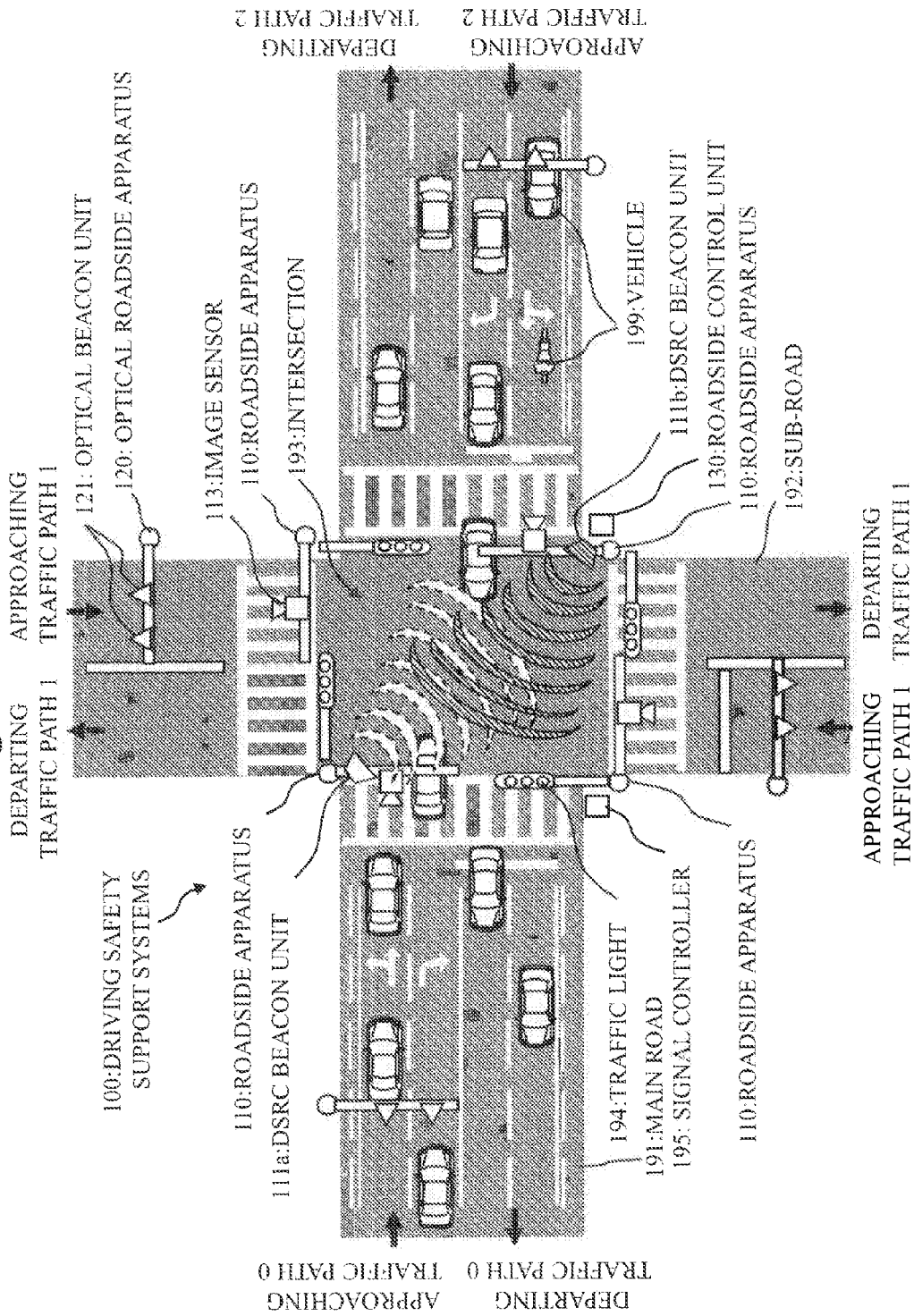
FIG. 13 is a diagram showing a second method of disposing DSRC beacon units 111 in Embodiment 5.
Figure 14:
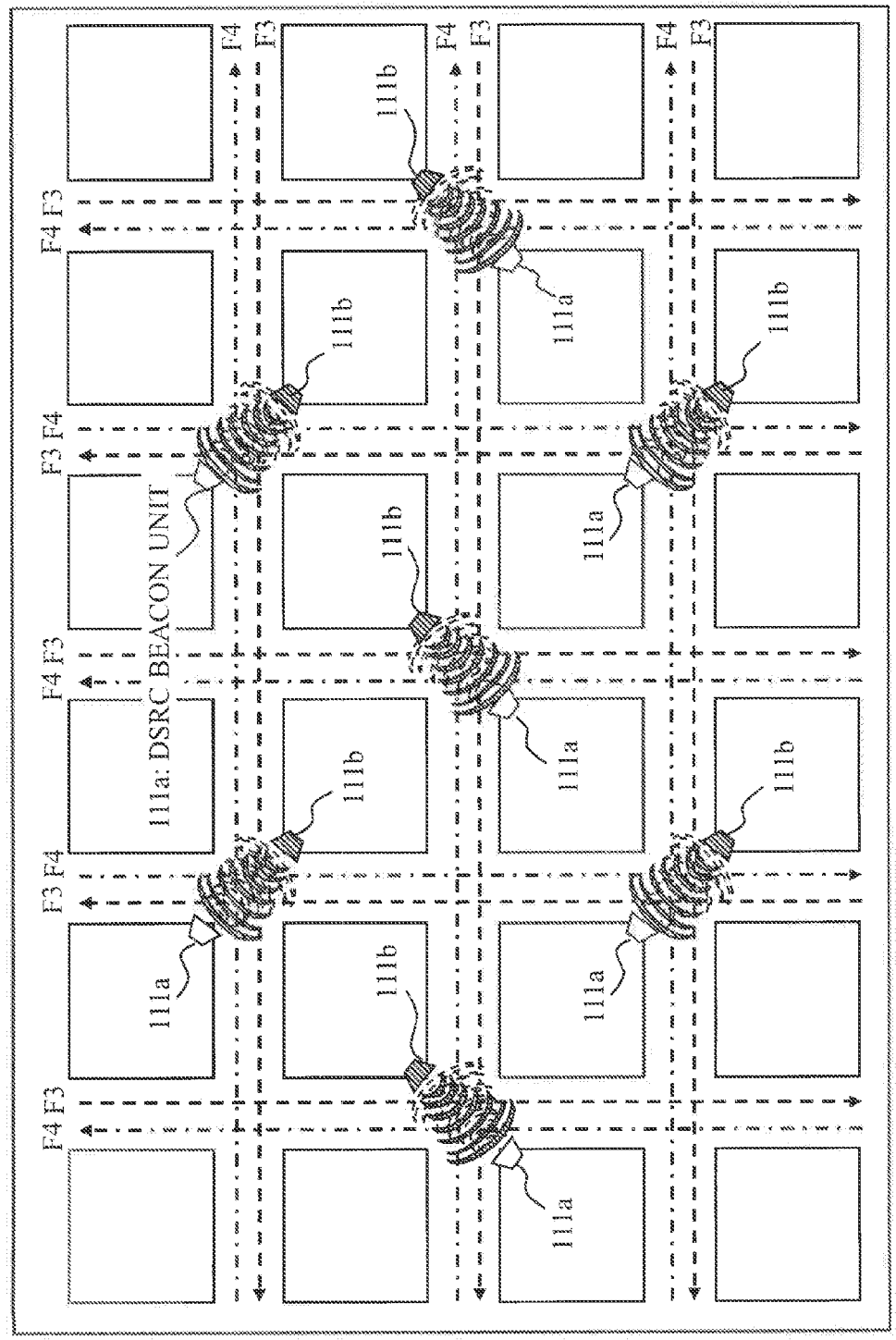
FIG. 14 is a second arrangement diagram of DSRC beacon units 111 in Embodiment 5.
Figure 15:
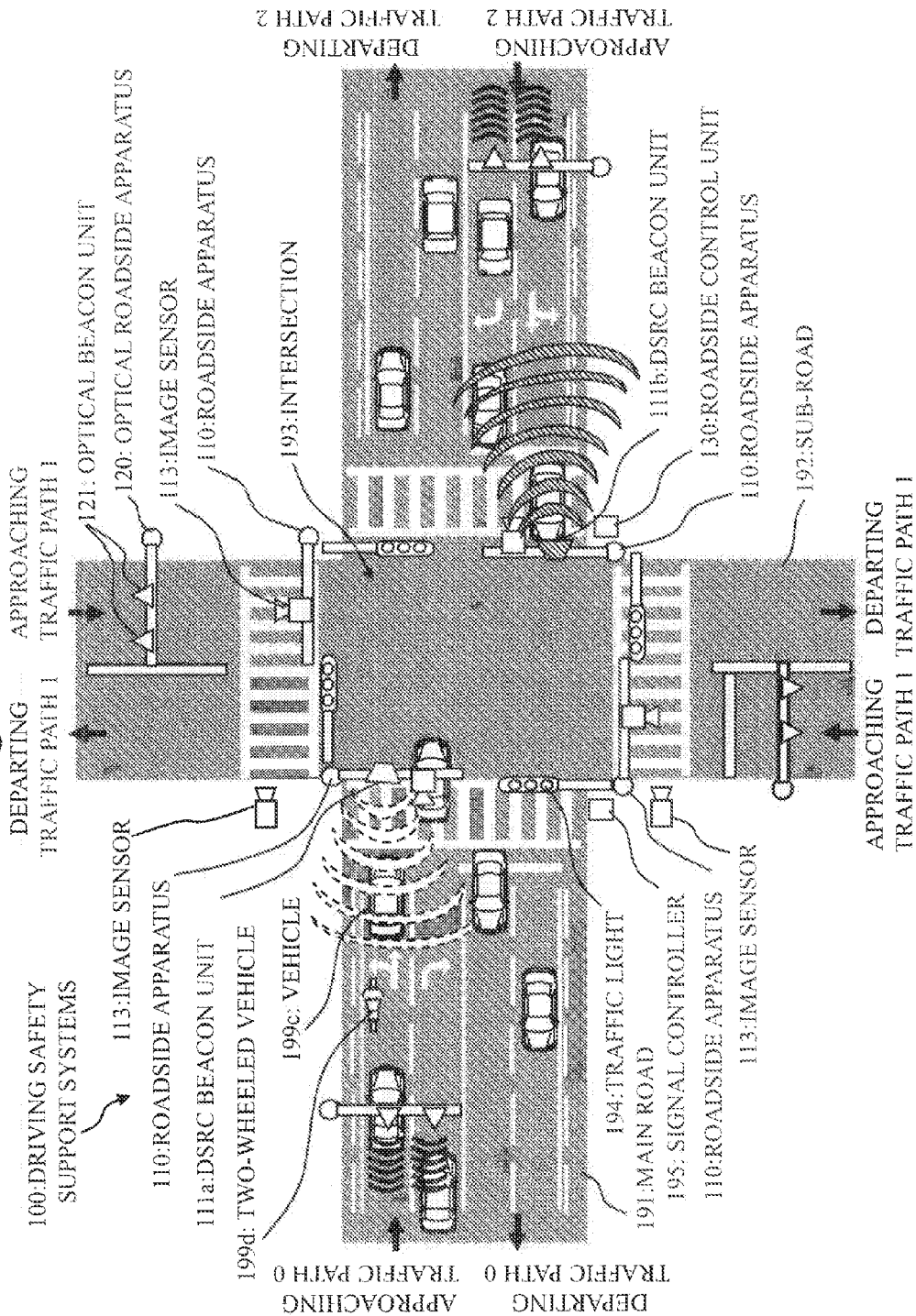
FIG. 15 is a diagram showing a third method of disposing DSRC beacon units 111 in Embodiment 5.
Figure 16:
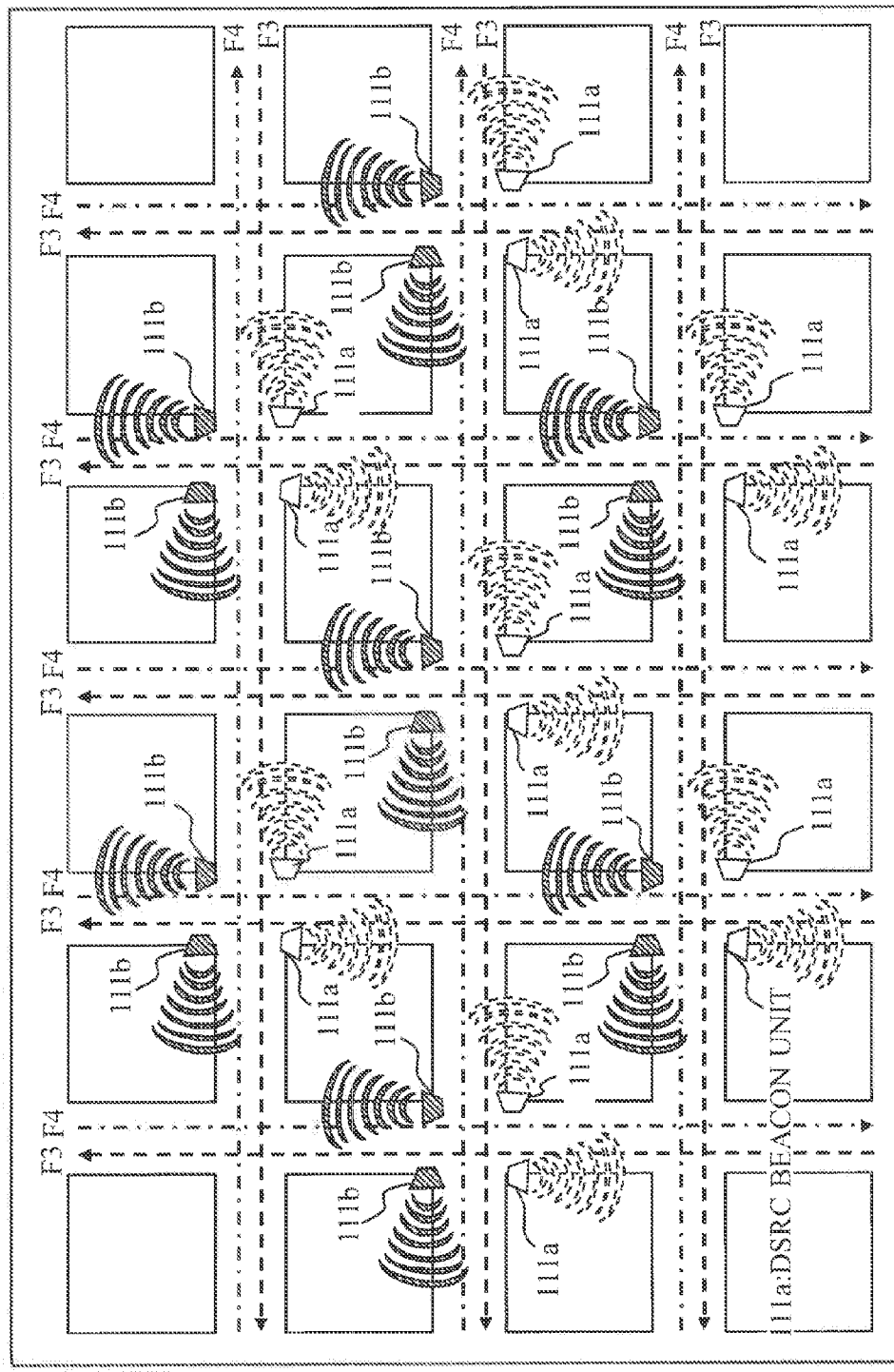
FIG. 16 is a third arrangement diagram of DSRC beacon units 111 in Embodiment 5.

100: driving safety support systems; 110: roadside apparatus; 111, 111a, 111b: DSRC beacon unit; 112, 112a, 112b, 112c, 112d: UHF beacon unit; 113: image sensor; 120: optical roadside apparatus; 121: optical beacon unit; 130: roadside control unit; 191: main road; 192: sub-road; 193: intersection; 194: traffic light; 195: signal controller; 199: vehicle; 199a: large-sized vehicle; 199b: standard-sized vehicle; 199c: vehicle; 199d: two-wheeled vehicle; 201: non-shadowing; 202: DSRC beacon; 203: UHF beacon; 291: near-distance zone; 292: intermediate-distance zone; 293, 293a, 293b, 293c, 293d: far-distance zone

The invention claimed is:

1. A driving support system comprising:
a UHF roadside unit that provides traffic information to an in-vehicle unit mounted on a vehicle using a UHF (Ultra-High Frequency) wave, wherein
the UHF roadside unit respectively sets a plurality of traffic information having different contents on UHF waves of different frequencies and transmits each of the UHF waves using a different transmission output power.

2. The driving support system according to claim 1, wherein
the UHF roadside unit transmits each of the UHF waves by time division.

3. The driving support system according to claim 2, wherein
the UHF roadside unit transmits three UHF waves of different frequencies as the respective UHF waves in ascending order of magnitude of transmission output powers at a time ratio of 6:3:1.

4. The driving support system according to claim 1, wherein
the driving support system includes a plurality of the UHF roadside units; and
The plurality of the UHF roadside units are disposed at intervals so that zones reached by the UHF waves transmitted with smallest ones of the transmission output powers do not overlap with one another and zones reached by the UHF waves transmitted with largest ones of the transmission output powers overlap with one another.

5. The driving support system according to claim 4, wherein
the frequencies of the UHF waves transmitted with the largest ones of the transmission output powers are different to each other between the UHF roadside units disposed adjacent to each other.

6. The driving support system according to claim 5, wherein
the driving support system includes first to fourth UHF roadside units;
each of the first to fourth UHF roadside units uses a first frequency for the UHF wave transmitted with a smallest one of the transmission output powers and a second frequency for the UHF wave transmitted with a second smallest one of the transmission output powers;
the first UHF roadside unit uses a third frequency for the frequency of the UHF wave transmitted with the largest one of the transmission output powers;
the second UHF roadside unit uses a fourth frequency for the frequency of the UHF wave transmitted with the largest one of the transmission output powers;
the third UHF roadside unit uses a fifth frequency for the frequency of the UHF wave transmitted with the largest one of the transmission output powers; and
the fourth UHF roadside unit uses a sixth frequency for the frequency of the UHF wave transmitted with the largest one of the transmission output powers.

7. The driving support system according to claim 1, wherein
the UHF roadside unit uses six frequency bands that do not overlap with one another within a specific bandwidth of approximately 10.0 MHz included in a UHF frequency band, and transmits the UHF waves using the frequency bands that are mutually different.

8. The driving support system according to claim 7, wherein
the six frequency bands respectively have a bandwidth of approximately 1.5 MHz and an interval between the mutual bands has a bandwidth of approximately 0.2 MHz.

9. The driving support system according to claim 8, wherein
respective center frequencies of the six frequency bands are approximately 715.75 MHz, 717.45 MHz, 719.15 MHz, 720.85 MHz, 722.55 MHz, and 724.25 MHz.

10. The driving support system according to claim 1, wherein
the UHF roadside unit transmits the UHF wave including information indicating the frequency of the UHF wave, the frequency of the UHF wave being set in advance corresponding to each of a plurality of the zones having different distances from the UHF roadside unit; and
the in-vehicle unit mounted on the vehicle switches a reception frequency to the frequency of the UHF wave corresponding to the zone in which the vehicle is positioned, based on the UHF wave transmitted from the UHF roadside unit and a result of position measurement of the vehicle by a GPS mounted on the vehicle, and receives the UHF wave corresponding to the zone in which the vehicle is positioned among the UHF waves transmitted from the UHF roadside unit.

11. The driving support system according to claim 10, wherein
the UHF roadside unit transmits the UHF wave including road information indicating information on an object located on a road; and
the in-vehicle unit mounted on the vehicle identifies a running position of the vehicle based on the road information included in the UHF wave transmitted from the UHF roadside unit.

12. The driving support system according to claim 1, wherein
the in-vehicle unit mounted on the vehicle inputs warning information from an input device and transmits the warning information using a frequency that is the same as the frequency of the UHF wave received from the UHF roadside unit; and
the UHF roadside unit receives the warning information transmitted from the in-vehicle unit, includes the received warning information on each of the UHF waves, and transmits the received warning information.

13. The driving support system according to claim 1, wherein
the in-vehicle unit mounted on the vehicle inputs warning information from an input device and transmits the warning information using the frequency of the UHF wave that is not used for the UHF roadside unit; and
the UHF roadside unit receives the warning information transmitted from the in-vehicle unit, includes the received warning information in each of the UHF waves, and transmits the received warning information.

14. The driving support system according to claim 1, wherein
two DSRC (Dedicated Short Range Communication) roadside units each of which provides traffic information to the in-vehicle unit mounted on the vehicle using an SHF (Super High Frequency) wave are further disposed at an intersection of right-angle crossroads; and
the two DSRC roadside units disposed at the intersection of the right-angle crossroads transmit SHF waves to the intersection in diagonal directions that cross each other.

15. The driving support system according to claim 14, wherein
one of the two DSRC roadside units transmits the SHF wave from a direction facing the vehicle when the vehicle that turned left from a main road toward a subroad has entered into the intersection.

16. The driving support system according to claim 1, wherein
two DSRC (Dedicated Short Range Communication) roadside units each of which provides traffic information to the in-vehicle unit mounted on the vehicle using an SHF (Super High Frequency) wave are further disposed at an intersection of right-angle crossroads; and
the two DSRC roadside units disposed at the intersection of the right-angle crossroads transmit SHF waves to a traffic path through which the vehicle enters into the intersection.

17. The driving support system according to claim 16, wherein
each of the two DSRC roadside units transmits the SHF wave from a direction facing the vehicle when the vehicle that turned left from a main road toward a sub-road has entered into the intersection.

* * * * *